(12) United States Patent
Tatsuda et al.

(10) Patent No.: US 8,449,232 B2
(45) Date of Patent: May 28, 2013

(54) INDEXING DEVICE FOR MACHINE TOOL

(75) Inventors: Yoshinori Tatsuda, Kanazawa (JP);
Youichi Nishida, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 995 days.

(21) Appl. No.: 12/522,217

(22) PCT Filed: Nov. 12, 2007

(86) PCT No.: PCT/JP2007/071895
§ 371 (c)(1),
(2), (4) Date: Jul. 6, 2009

(87) PCT Pub. No.: WO2008/087785
PCT Pub. Date: Jul. 24, 2008

(65) Prior Publication Data
US 2010/0084828 A1    Apr. 8, 2010

(30) Foreign Application Priority Data

Jan. 15, 2007   (JP) .................................. 2007-005276

(51) Int. Cl.
*B23B 31/30*   (2006.01)
(52) U.S. Cl.
CPC ..................................... *B23B 31/30* (2013.01)
USPC ........................... 409/201; 192/225; 279/4.03
(58) Field of Classification Search
USPC .. 409/201; 279/4.03; 192/85.47, 225; 74/813 L, 813 R, 814, 815, 816, 817, 822, 823, 824
IPC ....................................................... B23B 31/30
See application file for complete search history.

(56) References Cited

U.S. PATENT DOCUMENTS

| | | | | |
|---|---|---|---|---|
| 4,557,645 | A | * | 12/1985 | Marsland ....................... 409/144 |
| 5,234,081 | A | * | 8/1993 | Watanabe ........................ 188/74 |
| 6,640,404 | B2 | * | 11/2003 | Sheehan et al. .................... 29/40 |

(Continued)

FOREIGN PATENT DOCUMENTS

| | | |
|---|---|---|
| EP | 1524067 A | 10/2004 |
| JP | 2002103181 A | 4/2002 |
| JP | 2005138275 A | 6/2005 |

OTHER PUBLICATIONS

International Search Report issued Jan. 15, 2008 in corresponding International Application No. PCT/JP2007/071895.

*Primary Examiner* — Daniel Howell
*Assistant Examiner* — Michael Vitale
(74) *Attorney, Agent, or Firm* — Westerman, Hattori, Daniels & Adrian, LLP

(57) ABSTRACT

A cylindrical pressure-receiving member 34b is arranged in a space between a ring-shaped clamp sleeve 34a and a frame 31b such that the clamp sleeve 34a is fitted around a shaft 38b being integral with a rotary shaft 39. In an outer peripheral portion 34a2 of the clamp sleeve 34a, an annular groove 34a1 provided continuously over the entire circumference within an axial area of the outer peripheral portion 34a2 fitted into an inner peripheral portion 34b3 of the pressure-receiving member 34b provides a thin-wall portion 34a5. Also, a space surrounded by the annular groove 34a5 and the pressure-receiving member 34b provides a pressure chamber 34d communicating with a fluid control circuit. A predetermined gap 34d2 is provided between an inner peripheral surface 31b4 of the through hole 31b1 of the frame and an outer peripheral surface 34b2 of the pressure-receiving member 34b.

4 Claims, 12 Drawing Sheets

U.S. PATENT DOCUMENTS

2002/0114678 A1 * 8/2002 Klement ................. 409/201
2003/0183476 A1 * 10/2003 Bornhorst et al. ........ 192/85 AT
2005/0139036 A1   6/2005 Kato et al.

* cited by examiner

INDEXING DEVICE FOR MACHINE TOOL

TECHNICAL FIELD

The present invention relates to an indexing device used for a machine tool, and particularly, to a machining head including an indexing device used for a five-axis processing machine (processing machine capable of controlling five axes simultaneously) and a multi-face processing machine (machine tool), or to an indexing device (rotary table) including a rotary shaft for indexing an angle of a table on which a workpiece is mounted. More particularly, the present invention relates to a clamp mechanism which retains a position of the rotary shaft by supplying pressure fluid after an indexing operation.

BACKGROUND ART

A known indexing device is, for example, a device (rotary table) mounted on a bed of a machine tool and being capable of indexing a table on which a workpiece is mounted. For example, a rotary table disclosed in Patent Document 1 includes a frame having a through hole at the center of the frame, and a rotary shaft inserted into the through hole and supported rotatably relative to the frame. A table surface, on which a workpiece is mounted, of the rotary table is integrally provided with the rotary shaft. A worm wheel is accommodated within the frame, the work wheel being integral with the rotary table. A worm spindle is also accommodated within the frame at a position proximate to the worm wheel in a manner meshing with the worm wheel. The worm spindle is linked with an actuator such as a servomotor. When the servomotor is rotationally driven, the rotary table being integral with the rotary shaft rotates by a desired angle, thereby carrying out an indexing operation.

Meanwhile, the rotary table disclosed in Patent Document 1 includes a clamp mechanism (clamp sleeve) which retains an angle (position) of the rotary table after the indexing operation. In particular, the rotary table includes a cylinder segment extending in parallel to the through hole of the frame and integrally provided with the rotary table, and a clamp sleeve having a ring shape and provided in a space between the cylinder segment and the frame. The clamp sleeve includes a cylindrical portion fitted around the cylinder segment of the rotary table, and a flange portion continuously provided with the cylindrical portion and functioning as an attachment portion to the frame. The clamp sleeve has a thin-wall section provided outside the cylindrical portion and extending in an axial direction. A pressure chamber is formed between an inner space of the thin-wall section and the through hole of the frame accommodating the cylindrical portion. During a clamping operation, the thin-wall section expands inward in a radial direction by pressure oil supplied to the pressure chamber. Hence, a shaft portion of the rotary table with the angle thereof positioned can be held in a non-rotatable manner.
Patent Document 1: Japanese Unexamined Patent Application Publication No. 2002-103181

DISCLOSURE OF INVENTION

Problems to be Solved by the Invention

The rigidity of an inner periphery (through hole), to which the clamp sleeve is fitted, of the frame may not be uniform in a circumferential direction of the shaft. When the pressure oil is supplied, a pressure force of the pressure oil is also applied to an inner periphery end of the frame. Hence, the frame may be distorted outward at a position with a low rigidity in the through hole (inner periphery). The distortion affects a bearing arranged in the frame to support the rotary table. The rotary shaft being integral with the rotary table may be inclined by a certain degree. This may incline the workpiece mounted on the table surface by a certain degree. Thus, it is difficult to obtain a desired machining precision for the workpiece.

This problem occurs not only in the above-described rotary table, but also in a machining head for a machine tool including an indexing device having a fluid-pressure clamp mechanism similar to that described above. Although the indexing device indexes an angular position of the machining head with a high precision, a positional shift (angular shift) of the machining head may be generated by inclination of the support shaft as a result of a clamping operation (supply of the pressure oil). Thusly, it is difficult to obtain a desired machining precision for a workpiece.

The present invention is made in light of the situations. An object of the present invention is, in an indexing device which retains a rotary shaft by causing a clamp sleeve to expand with pressure fluid after indexing is carried out, to provide a structure for reducing a pressure force applied to a frame as a reactive force generated when the clamp sleeve expands toward the rotary shaft during a clamping operation or during supply of the pressure fluid, and therefore to prevent distortion of the frame, which may incline the rotary shaft, from occurring.

Means for Solving the Problems and Advantages

An indexing device for a machine tool according to an aspect of the present invention includes a frame having a through hole at the center, a rotary shaft extending through the through hole and rotatably supported by the frame, a shaft provided coaxially and integrally with the rotary shaft, a ring-shaped clamp sleeve fitted around an outer peripheral portion of the shaft, and a cylindrical pressure-receiving member. The pressure-receiving member is attached to the frame by inserting the pressure-receiving member such that an outer peripheral surface of the pressure-receiving member is fitted into an inner periphery end of the through hole of the frame with a plurality of clamp members interposed therebetween. A thin-wall section is defined by a bottom portion of an annular groove formed over the entire circumference within an axial area of an outer peripheral portion of the clamp sleeve fitted into an inner peripheral portion of the pressure-receiving member, and a pressure chamber communicating with a fluid control circuit is defined by a space surrounded by the annular groove and the pressure-receiving member. A predetermined gap is provided between an inner peripheral surface of the through hole in the frame and the outer peripheral surface of the pressure-receiving member.

With the aspect, during a clamping operation, pressure fluid is supplied to the pressure chamber. The thin-wall portion defining a part of the pressure chamber expands outward in the radial direction and presses the outer circumference of the shaft. Hence, the rotary shaft is retained in a non-rotatable manner relative to the frame. Also, the pressure-receiving member defining a part of the pressure chamber expands outward in the radial direction during a clamping operation because a pressure force of the pressure fluid acts outward in the radial direction with respect to the inner periphery end of the pressure-receiving member. However, the predetermined gap is provided between the pressure-receiving member and the inner peripheral surface of the through hole of the frame accommodating the pressure-receiving member. Hence, no pressure force is applied to the through hole until when the outer periphery end of the pressure-receiving member contacts the inner peripheral surface of the through hole of the frame. Also, the energy of the pressure force of the pressure fluid is absorbed when the pressure-receiving member is deformed in an expanding manner. Hence, even when the pressure-receiving member expands, and the gap is no longer left, the pressure force applied by the pressure-receiving member to the inner peripheral surface of the through hole of the housing is greatly decreased as compared with related art. Thus, the distortion of the frame which has occurred during a clamping operation is markedly decreased as compared with related art. In a rotary table or a machine tool provided with such an indexing device, an angular shift of a workpiece and a positional shift (angular shift) of a machining head can be decreased. Accordingly, processing with a higher precision (high-precision processing) can be carried out for a workpiece.

During a clamping operation (when pressure fluid is supplied to the pressure chamber), the pressure force applied to the inner peripheral surface of the through hole of the frame is decreased as described above. However, an interaction force acts in a direction to incline the clamp member as a result of expansion of the pressure-receiving member, and the interaction force is transmitted to the frame via the clamp member. Hence, a structure is preferable in which a pressure force in a direction to distort the frame is hardly transmitted to the clamp member which fixes the pressure-receiving member.

In particular, a shaft end of the pressure-receiving member opposite to a shaft end engaging with the frame has an engagement surface extending outward in a radial direction. The clamp members are defined by engagement members having engagement surfaces engaging with the shaft end of the pressure-receiving member opposite to the engaging shaft end, and by screw members engaging with the engagement members. The pressure-receiving member is attached to the frame by screwing the screw members into a plurality of screw holes provided in the frame while the engagement surfaces of the engagement members engage with the pressure-receiving member. A predetermined gap is provided between the pressure-receiving member and a surface of each screw member facing the pressure-receiving member (58b) at the center side of the rotary shaft.

With the configuration, even when the pressure-receiving member expands outward in the radial direction upon supply of the pressure fluid, in the pressure-receiving member, the relative positions of the engagement surface and the screw member are changed until the gap between the surface of the screw member facing the pressure-receiving member at the center side of the rotary shaft and the pressure-receiving member is no longer left. Thus, a pressure force in a direction to incline (bend) the screw member, which presses the pressure-receiving member via the loose-fit member, is eliminated or markedly decreased as compared with related art. Thus, an angular shift of a workpiece and a positional shift (angular shift) of a machining head caused by the frame being distorted when the pressure fluid, such as pressure oil, is supplied can be decreased unlike related art. High-precision processing can be carried out for a workpiece.

In particular, the engagement members have at their outer circumferences step surfaces serving as the engagement surfaces extending outward in the radial direction, and are formed of loose-fit members having through holes to which the screw members can be inserted. The pressure-receiving member has a plurality of bottomed through holes extending from an end portion (58b8) opposite to an end surface (58b7) engaging with the frame (31b) and arranged in a circumferential direction at an interval and being capable of engaging with the engagement surfaces of the loose-fit members. The pressure-receiving member is attached to the frame by screwing the screw members extending through the loose-fit members into the screw holes provided in the frame while the loose-fit members are inserted into the bottomed through holes. A predetermined gap is provided between an inner peripheral surface of each through hole of the pressure-receiving member and an outer peripheral surface of each loose-fit member.

With the configuration, the pressure-receiving member is attached to the frame such that the pressure-receiving member receives the pressure force from the loose-fit members through the bottom portion provided at the through hole. Even when the pressure-receiving member expands outward in the radial direction upon supply of the pressure fluid, in the pressure-receiving member, the relative positions of the bottom portion of the pressure-receiving member and the screw member are changed until the gap between the inner peripheral surface of the through hole of the pressure-receiving member and the outer peripheral surface of the loose-fit member is no longer left, or until the gap between the inner peripheral surface of the loose-fit member and the outer peripheral surface of the screw member is no longer left. Thus, a pressure force in a direction to incline (bend) the screw member, which indirectly presses the pressure-receiving member, is eliminated or markedly decreased as compared with related art. Accordingly, similar to the above, an angular shift of a workpiece and a positional shift (angular shift) of a machining head can be decreased. High-precision processing can be carried out for a workpiece as compared with related art.

In particular, the ring-shaped clamp sleeve has a cylindrical portion provided with the annular groove and a flange portion extending outward in the radial direction from an end portion of the cylindrical portion and integrally formed with the cylindrical portion. The frame has an attachment portion having an engagement surface extending outward in the radial direction from the through hole to accommodate the flange portion of the clamp sleeve. The pressure-receiving member is attached to the frame by coaxially inserting the pressure-receiving member such that a shaft end thereof engages with the flange portion of the clamp sleeve, screwing the plurality of clamp members into a plurality of screw holes provided in the flange portion of the clamp sleeve, and fixing the flange portion of the clamp sleeve to the attachment portion of the frame.

The clamp sleeve is fixed at the flange portion at the one side of the cylindrical portion, and is attached to the frame. The other end side, that is, the non-flange-side end portion of the cylindrical portion is locked in a non-rotatable manner relative to the pressure-receiving member. Accordingly, in a clamping state, even when a large torque in the circumferential direction acts on the rotary shaft, the cylindrical portion, particularly, the thin-wall portion of the clamp sleeve retaining the rotary shaft can prevent the rotary shaft from being twisted. Thus, processing with a higher precision can be carried out.

The above-described indexing device for a machine tool may serve as an indexing mechanism for a spindle unit to which a tool is attached and may be installed into a machining head for a machine tool. Also, the indexing device may be an indexing device (that is, rotary table) including the rotary shaft for indexing an angle of a table on which a workpiece is mounted.

BRIEF DESCRIPTION OF DRAWINGS

FIG. 3 includes two side views showing the support head component included in the machining head according to the embodiment of the present invention, in which FIG. 3(A) shows a state where a cover 18a is removed from a leg segment 30a viewed from a side farthest from a leg segment 30b, and FIG. 3(B) shows a state where a cover 18b is removed from a leg segment 30b viewed from a side farthest from the leg segment 30a.

FIG. 8 is an enlarged cross-sectional view showing a primary portion of a clamp mechanism in a machining head according to a yet another embodiment of the present invention, and more particularly, showing an attachment structure of a clamp sleeve 34a.

FIG. 9 is an enlarged cross-sectional view showing a primary portion of a clamp mechanism in a machining head according to a further embodiment of the present invention, and more particularly, showing an attachment structure of a clamp sleeve 34a.

FIG. 10 is an enlarged cross-sectional view showing a primary portion of a clamp mechanism in a machining head according to a still further embodiment of the present invention, and more particularly, showing an attachment structure of a clamp sleeve 34a.

FIG. 11 is an enlarged cross-sectional view showing a primary portion of a clamp mechanism in a machining head according to a yet further embodiment of the present invention, and more particularly, showing an attachment structure of a clamp sleeve 34a.

FIG. 12 is an enlarged cross-sectional view showing a primary portion of a clamp mechanism in a machining head according to a yet further embodiment of the present invention, and more particularly, showing an attachment structure of a clamp sleeve 34a.

Figure 1:
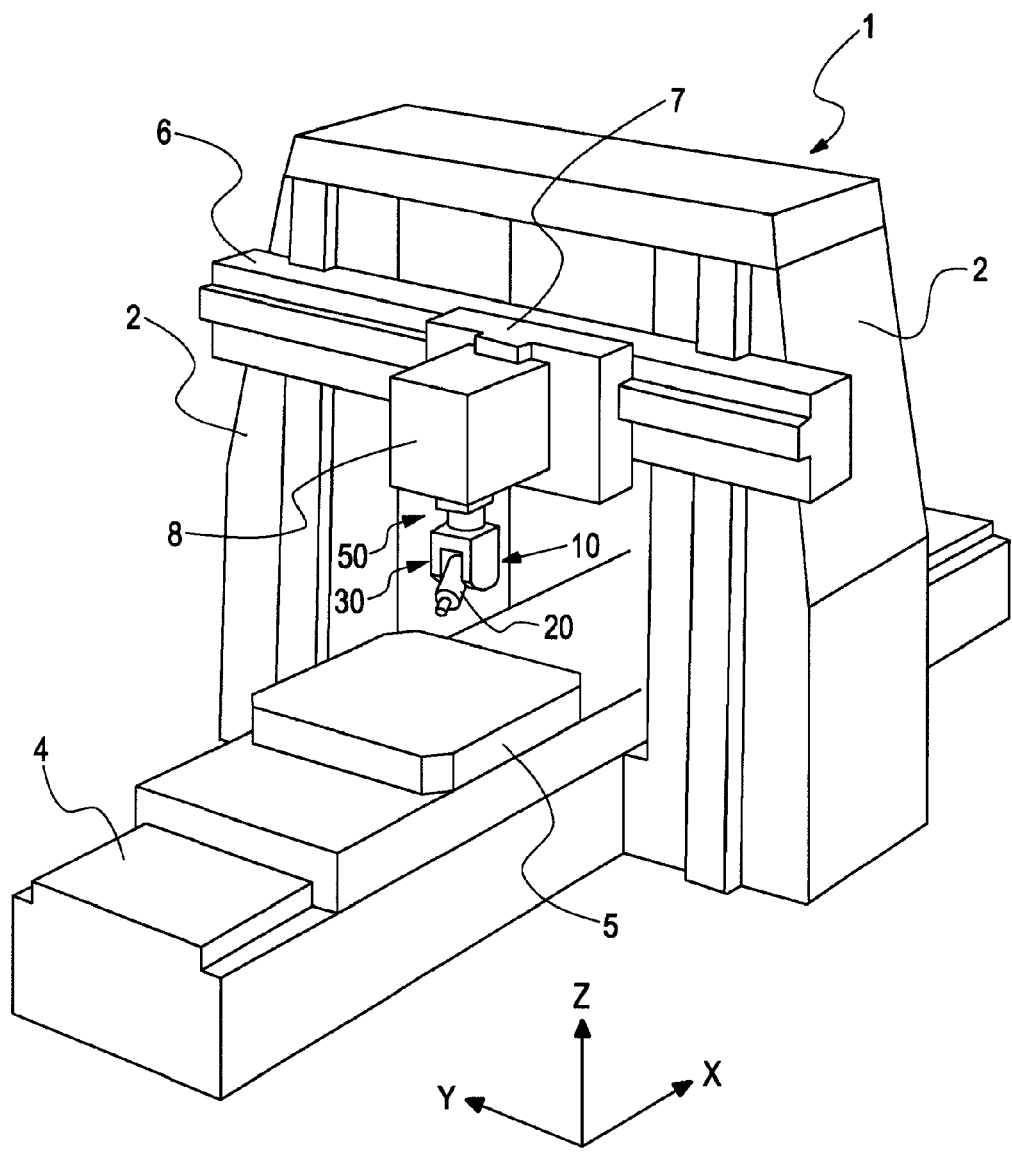
FIG. 1 is a perspective view showing an example of a machine tool (machining head) to which an indexing device according to the present invention is applied.

REFERENCE NUMERALS 1 machine tool
10 machining head
20 spindle unit
21 spindle
25 drive motor
25a rotor
25b stator
30 support head component (first support head component)
30a, 30b leg segment
30c supporting segment
31a, 31b housing
32 rotary shaft
33 DD motor
33a rotor
33b stator
34 clamp mechanism
34a clamp sleeve
34b pressure-receiving member
34d pressure chamber
35, 36 bearing
37 rotary joint
37a distributor
37b shaft
38 rotary joint
38a distributor
38b shaft
39 rotary shaft
41, 44 rotation detector
41a, 44a detector head
41b, 44b detector ring
50 second support head component
51 housing
52 rotary shaft
53 DD motor
53a stator
53b rotor
54 clamp sleeve
55 distributor
56 bearing (triple cylindrical roller bearing)
57 bearing
58 clamp mechanism
58a clamp sleeve
58b pressure-receiving member
58d pressure chamber
58e loose-fit member
58f washer
60 screw member

BEST MODES FOR CARRYING OUT THE INVENTION

An indexing device of the present invention will be described below on the basis of an example in which an indexing device is included in a machining head for a machine tool, as an indexing mechanism for a spindle unit to which a tool is attached.

FIG. 1 illustrates a double-housing machine tool 1 called machining center, as an example of a compound processing machine. The double-housing machine tool 1 includes left and right columns 2, 2 attached to a bed 4, a cross rail 6 movable vertically (along Z axis) on the columns 2, 2, a saddle 7 movable horizontally (along Y axis) on the cross rail 6, a ram 8 movable along the Z axis on the saddle 7, and a table 5 movable in the front-back direction (along X axis) on the bed 4. Furthermore, the ram 8 has a machining head 10 attached thereto, which includes a spindle unit 20 including a spindle to which a tool is attached.

When machining a workpiece, the double-housing machine tool 1 moves the table 5, the cross rail 6, the saddle 7, and the ram 8, and the machining head 10 indexes the angular position of the spindle unit 20 in accordance with numerical control based on a preliminarily set program. Accordingly, in the machine tool 1, the tool can be set at appropriate angles for machining various surfaces of the workpiece so that the workpiece can be cut into complicated shapes.

The machining head 10 includes an indexing mechanism for indexing the angular position of the spindle unit 20. The machining head is one including a drive motor of a direct-drive type (referred to as "DD motor" hereinafter) as means for driving the indexing mechanism. The DD motor includes a motor stator and a motor rotor disposed within a housing of the machining head 10, and the rotor is linked with a support shaft that supports the spindle unit. The machining head 10 includes the spindle unit 20 and a support head component (head support portion) that supports the spindle unit 20, and has an inner-rotor-type DD motor in the support head component, as the means for driving, in which the rotor faces the inner peripheral surface of the stator. Such a machining head is, for example, disclosed in Japanese Unexamined Patent Application Publication No. 2-116437.

The machining head 10 will be described in more detail with reference to FIGS. 2 to 5. FIGS. 2 to 5 illustrate an embodiment of the present invention. The machining head 10 in the drawing includes the spindle unit 20 having a spindle 21 to which a tool is attached, a first support head component 30 (corresponding to "support head component" of the present invention) that supports the spindle unit 20, and a second support head component 50 that supports the first support head component 30.

Figure 2:
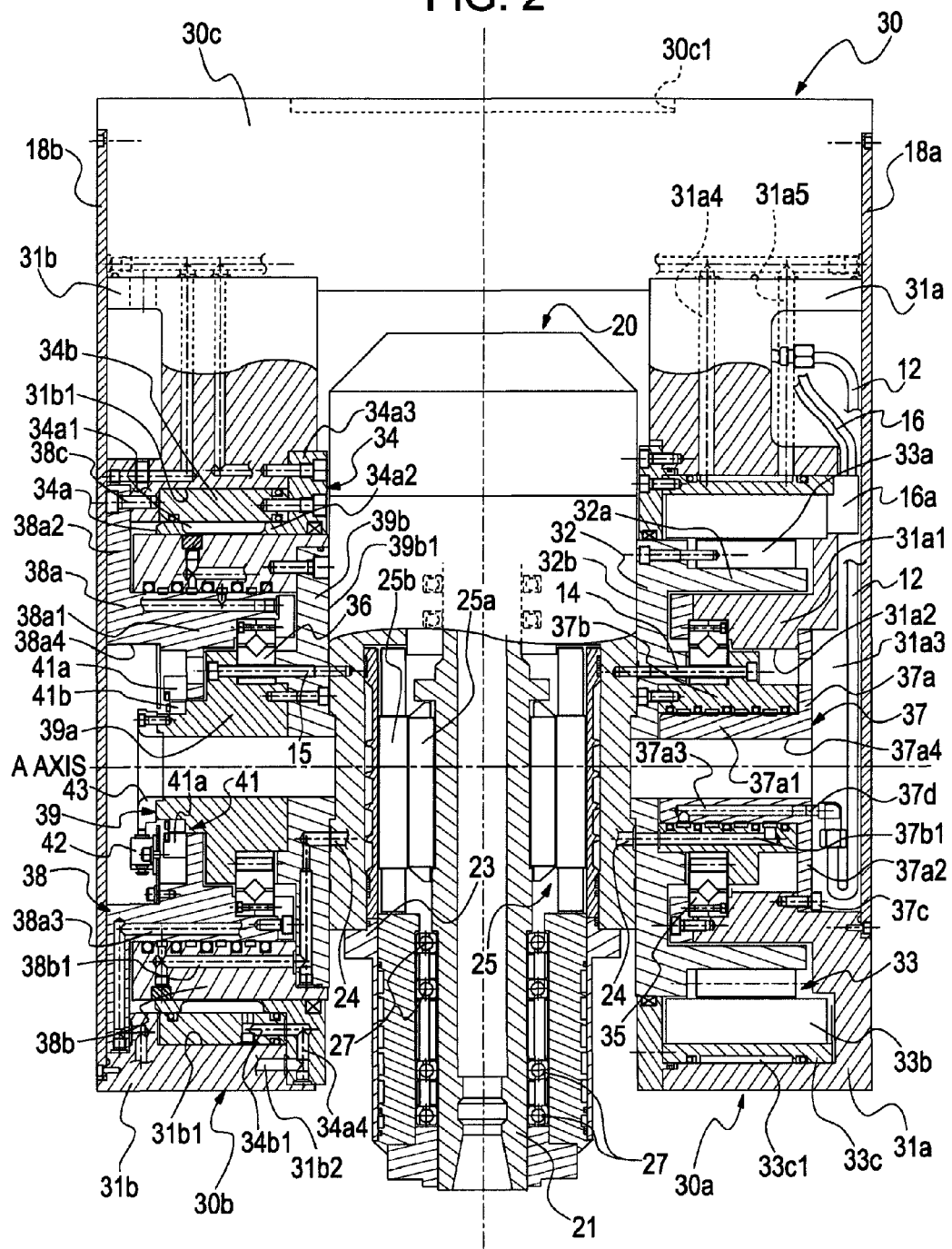
FIG. 2 is a front partially-cutaway view of a support head component included in a machining head according to the embodiment of the present invention.

The spindle unit 20 is a spindle head having a drive motor built therein, and the built-in drive motor rotates the spindle 21 at high speed (FIG. 2).

A housing 23 of the spindle unit 20 has the spindle 21 extending therethrough and accommodates a drive motor 25 that surrounds the spindle 21. The drive motor 25 includes a rotor 25a fitted around the spindle 21, and a stator 25b facing an outer peripheral surface of the rotor 25a. The spindle 21 is rotatably supported by a plurality of bearings 27, for example, angular contact bearings, arranged in a front-back direction of the drive motor 25 (in the vertical direction in the figure). When an exciting current is supplied to the stator 25b, an excitation force is generated between the rotor 25a and the stator 25b. The rotor 25a rotates in response to the excitation force, and thus the spindle 21 is rotated.

In addition to supporting the spindle unit 20, the first support head component 30 has a function of rotating the spindle unit 20 around an axis line (referred to as "A axis" hereinafter) extending perpendicular to a rotary axis line of the spindle 21 in order to index the angular position of the spindle unit 20.

The first support head component 30 has the shape of a fork in which a pair of leg segments 30a, 30b is joined to a supporting segment 30c. The leg segments 30a, 30b support the spindle unit 20. Each of the leg segments 30a, 30b includes therein a rotatable support shaft that supports the spindle unit 20. In the support head component 30 in the drawing, a DD motor 33 (corresponding to "drive motor" of the present invention) that rotationally drives the spindle unit 20 is disposed only in the leg segment 30a of the two leg segments 30a, 30b. Accordingly, regarding the support shafts in the respective leg segments 30a, 30b, the support shaft in the leg segment 30a will be referred to as a driving support shaft (corresponding to "support shaft" of the present invention) hereinafter, whereas the support shaft in the leg segment 30b will be referred to as a driven support shaft hereinafter.

The configuration of the leg segment 30a will be described in detail below.

The leg segment 30a has, as a main body, a housing 31a serving as a frame. The housing 31a accommodates, for example, a rotor (motor rotor) 33a and a stator (motor stator) 33b that constitute the DD motor 33, the driving support shaft that supports the spindle unit 20, a bearing (for example, cross roller bearing) 35 for rotatably supporting the driving support shaft, and a rotary joint 37 for supplying processing fluid (referred to merely as "fluid" hereinafter) to the spindle unit 20.

Figure 3:
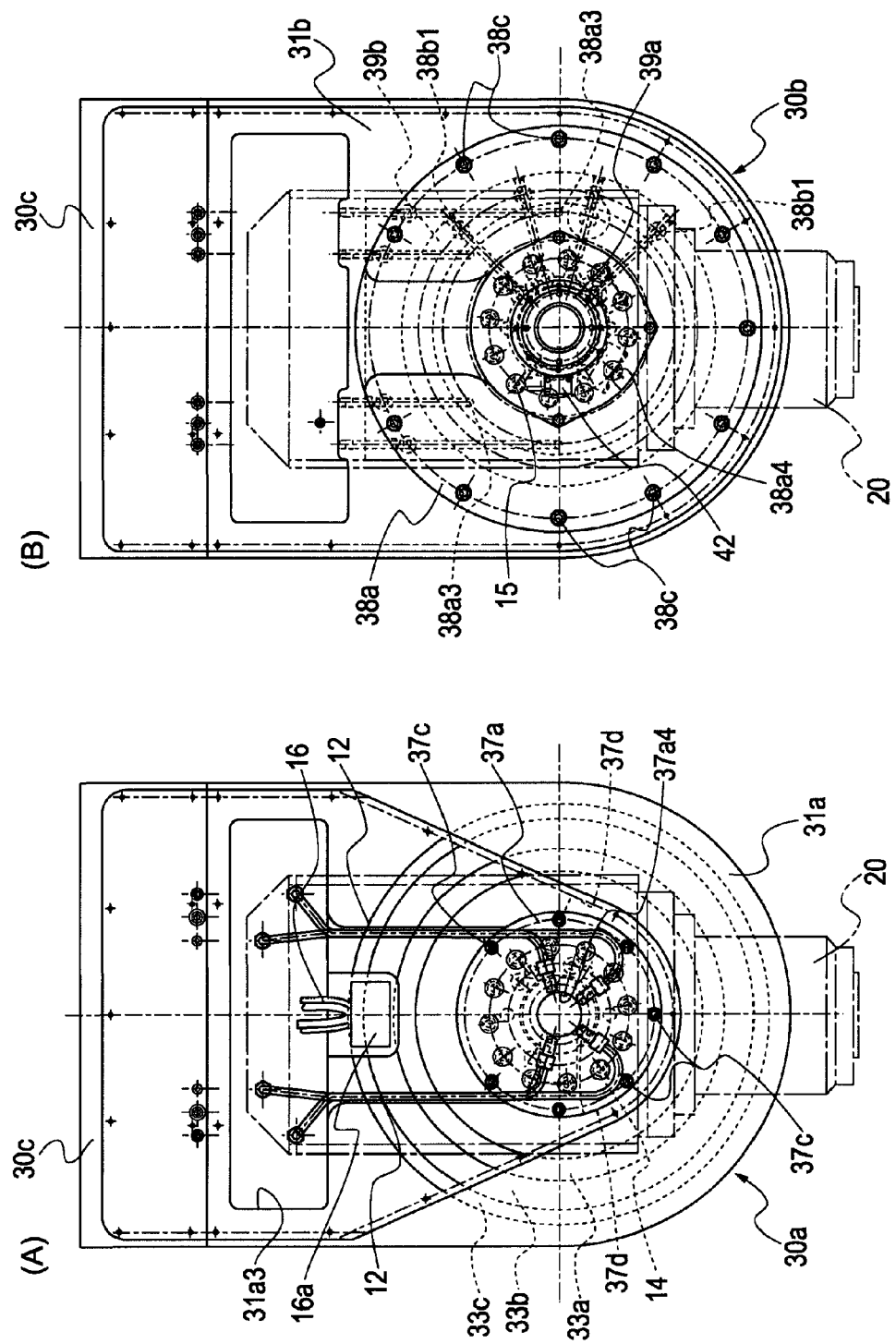

A side of the housing 31a proximate to the leg segment 30b has a large opening through which the DD motor 33 and a rotary shaft 32 (described below), are inserted. Moreover, the housing 31a also has a cylindrical portion 31a1 extending along the A axis from a side surface of the housing 31a farthest from the leg segment 30b. The cylindrical portion 31a1 has a through hole 31a2 through which the rotary joint 37 extends along the A axis. The side surface of the housing 31a farthest from the leg segment 30b has a recess 31a3 through which a fluid-supply pipe and a current-supply cable (described below) extend. A side of the leg segment 30a farthest from the leg segment 30b has a side-surface cover 18a attached thereto. The side-surface cover 18a covers the recess 31a3. FIG. 3 shows a state where the side-surface cover 18a is removed. In particular, FIG. 3(A) shows a state where the cover 18a is removed from the leg segment 30a viewed from the side farthest from the leg segment 30b, and FIG. 3(B) shows a state where the cover 18b is removed from the leg segment 30b viewed from the side farthest from the leg segment 30a.

The rotary joint 37 includes a distributor 37a fixed to the housing 31a and a shaft 37b rotatably fitted around an outer peripheral surface of a cylindrical portion 37a1 of the distributor 37a.

In a state where the distributor 37a extends through the through hole 31a2 of the housing 31a, a flange portion 37a2 of the distributor 37a is attached to the housing 31a with a plurality of screw members 37c arranged in a circumferential direction. Furthermore, the center of the distributor 37a is provided with a through hole 37a4 through which, for example, cables can extend to the spindle unit 20.

The distributor 37a also has a plurality of fluid channels 37a3 that are arranged at different positions in the circumferential direction. The fluid channels 37a3 are provided for supplying or discharging fluid. On the other hand, the shaft 37b has a plurality of fluid channels 37b1 that correspond to the fluid channels 37a3 of the distributor 37a. In FIG. 2, only one of the fluid channels 37a3 and one of the fluid channels 37b1 are representatively shown.

The fluid channels 37a3 and the fluid channels 37b1 corresponding thereto communicate with each other through annular grooves formed continuously over the entire circumference of an engagement surface between the distributor 37a and the shaft 37b. This communication state is maintained even upon rotation of the shaft 37b. Furthermore, each of the fluid channels 38b1 communicates with a fluid supply or discharge port 24 of the spindle unit 20. The distributor 37a and the shaft 37b have seal members interposed therebetween for attaining a sealed state between the annular grooves.

The distributor 37a also has a plurality of fluid supply or discharge ports 37d arranged at different positions in the circumferential direction. Each of the ports 37d is connected to a fluid supply or discharge pipe 12. Fluid supplied from a fluid control circuit (not shown) through a supply pipe 12 is transferred from the rotary joint 37 to the spindle unit 20 through the corresponding port 24. When the fluid is subject to circulation, the fluid circulating within the spindle unit 20 is discharged to a discharge pipe 12 via the rotary joint 37. The fluid to be supplied to the spindle unit 20 is, for example, cooling oil for cooling the drive motor 25 or the spindle 21 that rotates at high speed, sealing air for preventing cutting chips and powder from entering the spindle unit 20 (i.e., the rotating portion of the spindle 21), and cooling water for cooling the rotating tool and the like used during the machining process.

The DD motor 33 includes the stator 33b disposed to be fixed with respect to the housing 31a, and the rotor 33a disposed to face the inner peripheral surface of the stator 33b. The rotor 33a is integrally attached with a cylindrical portion 32a so as to be fitted on the outer periphery of the cylindrical portion 32a of the rotary shaft 32. In particular, the DD motor 33 in the drawing serving as the inner-rotor-type motor is constituted as a permanent magnet synchronous brushless DC motor. In the rotor 33a, a plurality of poles are magnetic poles formed of permanent magnets whose material is rear-earth metal or the like and the plurality of magnetic poles are arranged in the circumferential direction such that the magnetic poles adjacent to each other in the circumferential direction are alternately reversed. In the stator 33b, a plurality of electromagnets that generate magnetic forces when currents are applied thereto are arranged in the circumferential direction to correspond to the magnetic poles of the rotor 33a, and the rotor 33a is rotated by selectively applying currents to the electromagnets in the stator 33b.

The stator 33b is fitted to the inner peripheral surface of a stator sleeve 33c fixed to the housing 31a. The stator sleeve 33c has an annular groove 33c1 in an outer peripheral surface thereof. On the other hand, the housing 31a has a fluid supply path 31a4 and a fluid discharge path 31a5 that communicate with the annular groove 33c1. A cooling fluid (for example, oil) for cooling the DD motor 33 is supplied from the fluid supply path 31a4 toward the annular groove 33c1 so as to decrease heat generated by the DD motor 33 due to the rotation of the rotor 33a. The annular groove 33c1 has a helical shape so that when fluid is supplied from the fluid supply path 31a4, the fluid circulates the annular groove 33c1 so as to be discharged from the fluid discharge path 31a5 (although not shown specifically in the drawings).

The rotor 33a is fitted around an outer peripheral surface of the rotary shaft 32 rotatably disposed within the housing 31a. The rotary shaft 32 is disposed concentrically with a rotary axis line of the shaft 37b of the rotary joint 37 and is fixed to the shaft 37b with a plurality of screw members arranged in the circumferential direction. The rotor 33a is disposed such that its outer peripheral surface faces the inner peripheral surface of the stator 33b. The rotor 33a is fitted around an outer peripheral surface of the cylindrical portion 32a of the rotary shaft 32 in a non-rotatable manner relative to the rotary shaft 32.

An end surface 32b of the rotary shaft 32 proximate to the leg segment 30b has the spindle unit 20 fixed thereto with a plurality of screw members 14 arranged in the circumferential direction. In other words, the spindle unit 20 is fixed to the end surface 32b of the rotary shaft 32 so as to be supported by the rotary shaft 32 in an integral manner. Consequently, in the leg segment 30a, the rotary shaft 32 and the shaft 37b of the rotary joint 37 rotating together with the rotary shaft 32 constitute the driving support shaft for the spindle unit 20.

In a state where the rotary shaft 32 is joined to the shaft 37b of the rotary joint 37, the cylindrical portion 32a of the rotary shaft 32 surrounds the cylindrical portion 31a1 of the housing 31a with a slight gap therebetween. In other words, in a state where the rotary shaft 32 is joined to the shaft 37b, the cylindrical portion 31a1 of the housing 31a is disposed within the inner peripheral surface of the cylindrical portion 32a, i.e., within the rotor 33a in the radial direction, the rotor fitted around the cylindrical portion 32a.

The cylindrical portion 31a1 of the housing 31a and the shaft 37b of the rotary joint 37 arranged within the through hole 31a2 have a bearing 35 interposed therebetween. The bearing 35 provides a state where the shaft 37b is rotatably supported by the housing 31a.

As described above, in the illustrated embodiment, the driving support shaft (the shaft 37b of the rotary joint 37 and the rotary shaft 32 attached to the shaft 37b) includes a large-diameter section (the cylindrical portion 32a of the rotary shaft 32) around which the rotor 33a of the DD motor 33 is fitted, and a shaft section (the shaft 37b of the rotary joint 37) disposed within this large-diameter section in the radial direction and supported rotatably by the bearing 35. The cylindrical portion 31a1 of the housing 31a is disposed between the large-diameter section and the shaft section, and the bearing 35 is interposed between the cylindrical portion 31a1 and the support shaft. Accordingly, the support shaft is rotatably supported by the housing 31a. As shown in the drawings, the positioning of the bearing 35 along the A axis is within a range occupied by the DD motor 33 along the A axis.

The configuration of the leg segment 30b that supports the spindle unit 20 at a position opposite to the leg segment 30a will be described in detail below.

The leg segment 30b has, as a main body, a housing 31b serving as a frame. The housing 31b accommodates, for example, a clamp mechanism 34 for retaining an angular position of the spindle unit 20, the driven support shaft that supports the spindle unit 20, a bearing 36 for rotatably supporting the driven support shaft, and a rotary joint 38.

The housing 31b has a through hole 31b1 extending therethrough along the A axis. The clamp mechanism 34, the driven support shaft, the bearing 36, and the rotary joint 38 are accommodated within this through hole 31b1. A side surface of the housing 31b farthest from the leg segment 30a has a recess (not shown) like that provided in the leg segment 30a. The recess is covered with a side-surface cover 18b.

The rotary joint 38 is similar to the rotary joint 37 of the leg segment 30a, and includes a distributor 38a fixed to the housing 31b and a shaft 38b serving as a shaft rotatably fitted around an outer peripheral surface of a cylindrical portion 38a1 of the distributor 38a.

The distributor 38a includes the above-described cylindrical portion 38a1, and a flange portion 38a2 extending outward radially from an end of the cylindrical portion 38a1 farthest from the leg segment 30b. The flange portion 38a2 of the distributor 38a is joined to the housing 31b with a plurality of screw members 38c arranged in the circumferential direction. Furthermore, the center of the distributor 38a is provided with a through hole 38a4 extending along the A axis.

The distributor 38a has a plurality of fluid channels 38a3 arranged at different positions in the circumferential direction. On the other hand, the shaft 38b has a plurality of fluid channels 38b1 that correspond to the fluid channels 38a3 of the distributor 38a. The fluid channels 38a3 and the fluid channels 38b1 corresponding thereto communicate with each other through annular grooves extending around an engagement surface between the distributor 38a and the shaft 38b. This communication state is maintained even upon rotation of the shaft 38b.

In the leg segment 30b, a rotary shaft 39 corresponding to the rotary shaft 32 of the leg segment 30a receives the bearing 36, and hence, the rotary shaft 39 includes two members of a shaft member 39a and a flange member 39b. The rotary shaft 39 (the shaft member 39a and the flange member 39b) is disposed such that a rotary axis line thereof is aligned with the rotary axis line (that is, A axis) of the rotary shaft 32 in the leg segment 30a.

The shaft member 39a of the rotary shaft 39 is arranged in the through hole 38a4 of the distributor 38a. The shaft member 39a is rotatably supported by the distributor 38a via the bearing 36. Thus, the shaft member 39a and the distributor 38a are arranged to be concentrically with the A axis.

The flange member 39b of the rotary shaft 39 has an end surface 39b1 at a side thereof proximate to the leg segment 30b. The end surface 39b1 is parallel to the end surface 32b of the rotary shaft 32 in the leg segment 30a. The end surface 39b1 has the spindle unit 20 fixed thereto with a plurality of screw members 15 arranged in the circumferential direction. Consequently, in the leg segment 30b, the rotary shaft 39 functions as the driven support shaft for the spindle unit 20. The rotary shaft 39 is fixed to the shaft 38b of the rotary joint 38 at the flange member 39b, and hence is rotated with the shaft 38b simultaneously. Accordingly, the shaft 38b of the rotary joint 38 is also part of the driven support shaft.

Figure 5:
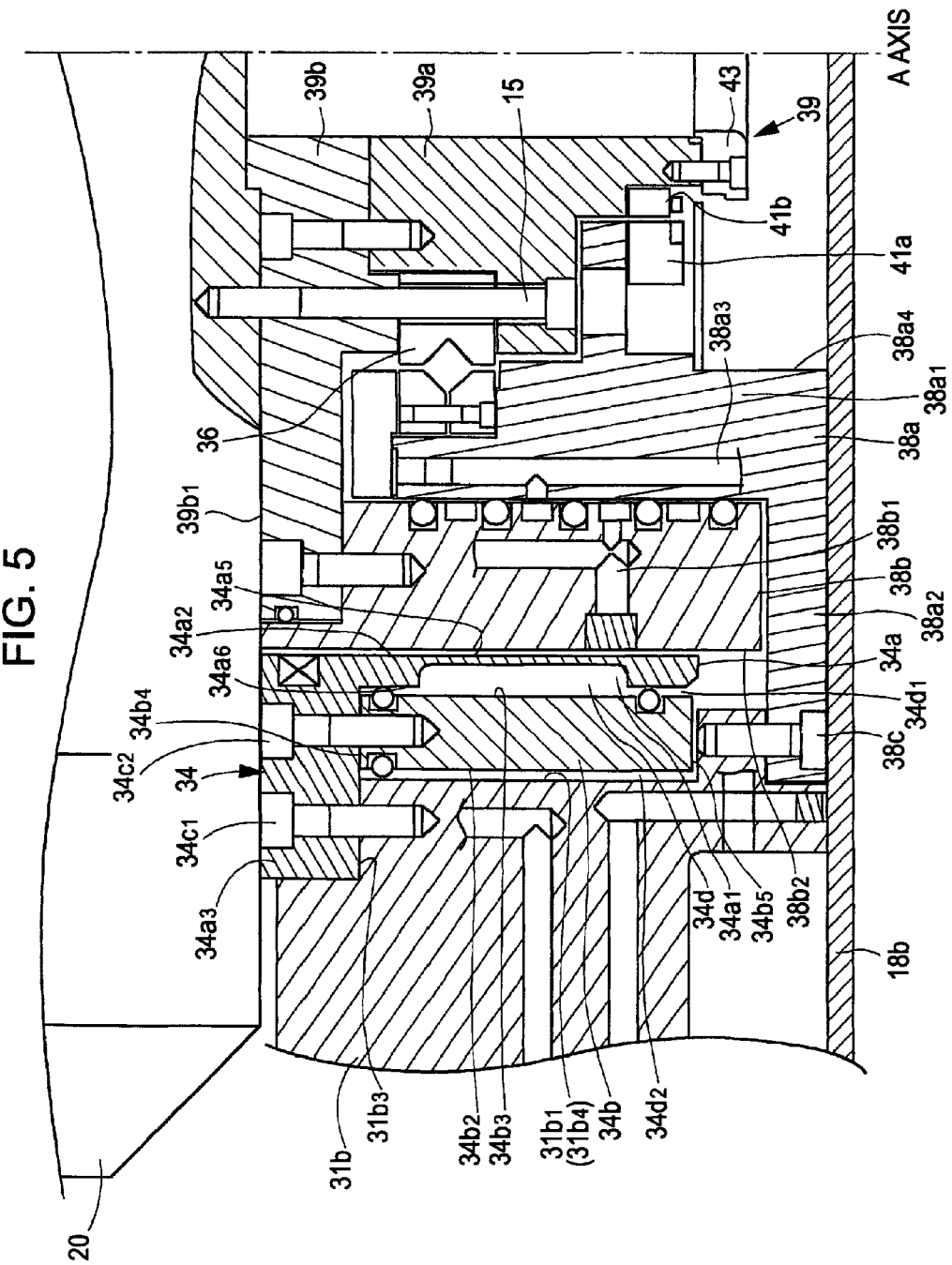
FIG. 5 is an enlarged front partially-cutaway view showing a primary portion of a clamp mechanism in the machining head of the present invention.

The clamp mechanism 34 for retaining the rotational position (angular position) of the spindle unit 20 is mainly constituted by a clamp sleeve 34a having a ring shape (FIG. 2, FIG. 5). The clamp sleeve 34a includes a cylindrical portion 34a2 having an annular groove 34a1 that forms a pressure chamber 34d, and a flange portion 34a3 extending outward radially from an end of the cylindrical portion 34a2 proximate to the leg segment 30a. The cylindrical portion 34a2 surrounds the shaft 38b of the rotary joint 38, which is rotated with the rotary shaft 39, in a manner such that the cylindrical portion 34a2 permits rotation of the shaft 38b.

The housing 31b has an attachment portion 31b3 continuously arranged from the through hole 31b1. The attachment portion 31b3 has a plane extending radially outward with respect to the A axis so as to receive the clamp sleeve 34a extending through the through hole 31b1. On the other hand, the flange portion 34a3 of the clamp sleeve 34a has a plurality of through holes to which screw members 34c2 are inserted when a pressure-receiving member 34b (described below) is attached, and a plurality of through holes to which screw members 32c1 are inserted when the clamp sleeve 34a is attached to the housing 31b. The through holes are arranged in the circumferential direction at an interval.

The cylindrical portion 34a2 of the clamp sleeve 34a and the through hole 31b1 of the housing 31b have a cylindrical pressure-receiving member 34b interposed therebetween. The pressure-receiving member 34b is fitted to the inside of the through hole 31b1. In particular, the pressure-receiving member 34b has a plurality of screw holes corresponding to the plurality of through holes in the flange portion 34a3. The cylindrical pressure-receiving member 34b is inserted to be fitted around the cylindrical portion 34a2 of the clamp sleeve 34a3, and the screw members 34c2 are screwed into the corresponding screw holes of the pressure-receiving member 34b through the plurality of through holes of the flange portion 34a. As described above, the pressure-receiving member 34b is fitted around the clamp sleeve 34a. The clamp sleeve 34a is inserted such that the mounted pressure-receiving member 34b is fitted into the through hole 31b1. The attachment portion 31b3 of the housing 31b has a plurality of screw holes corresponding to the plurality of through holes provided in the circumferential direction of the pressure-receiving member 34b. The clamp sleeve 34a is attached to the attachment portion 31b3 by inserting screw members 34c1 from the through holes of the flange portion 34a3 and screwing the screw members 34c1 into the screw holes. Thus, the clamp sleeve 34a is fitted into the housing 31b.

Figure 4:
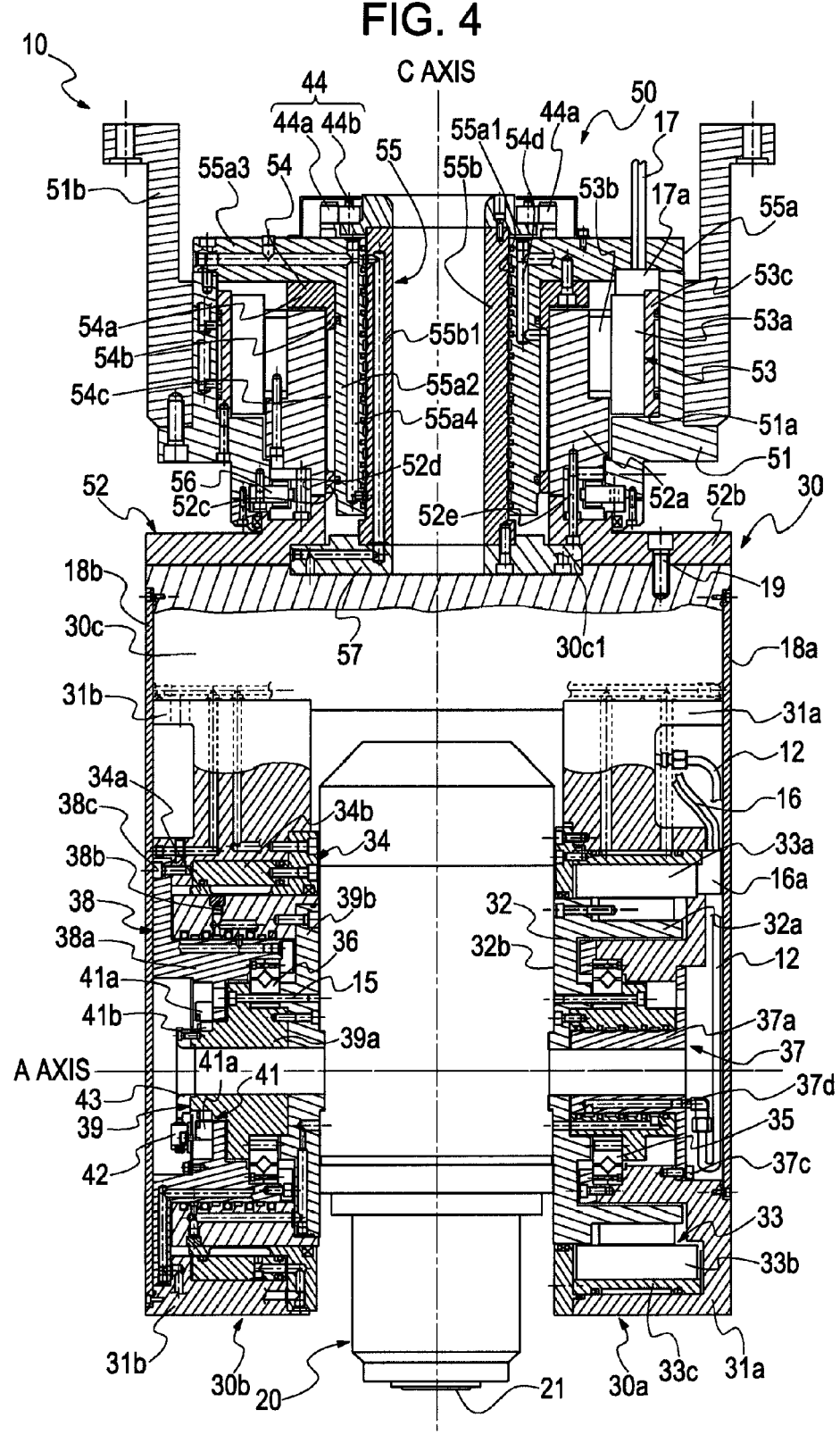
FIG. 4 is a front partially-cutaway view of the machining head according to the embodiment of the present invention.

Shaft ends 34b4, 34b5 of the pressure-receiving member 34b have planes continuously arranged in the circumferential direction and extending in a direction orthogonal to the radial direction. The shaft end 34b4 is arranged to engage with the flange portion 34a3 of the clamp sleeve 34a. At an inner peripheral surface 34b3 of the pressure-receiving member 34b, O-rings (not shown) are arranged at positions on both sides of the annular groove 34a1 over the entire circumference of the inner peripheral surface 34b3. Accordingly, the pressure chamber 34d can hold an air-tight or liquid-tight state (FIG. 4). Also, a fluid channel 34b1 provided in the pressure-receiving member 34b communicates with the pressure chamber 34d (FIG. 2). The fluid channel 34b1 communicates with a fluid channel 31b2 provided in the housing 31b through a fluid channel 34a4 provided in the flange portion 34a3 of the clamp sleeve 34a.

In the clamp mechanism 34, when pressure fluid (for example, pressure oil) is supplied to the pressure chamber 34d through these fluid channels, a thin-wall section 34a5 in the cylindrical portion 34a2 of the clamp sleeve 34a, which corresponds to the annular groove 34a1, becomes deformed inward in the radial direction of the cylindrical portion 34a2. As a result, a clamping force acts on the shaft 38b, whereby a state is attained in which the shaft 38b and the rotary shaft 39 joined thereto are prevented from rotating (clamping state).

When the pressure of the fluid (pressure oil) supplied to the pressure chamber 34d through the fluid control circuit is released, the deformed state in which the thin-wall section 34a5 of the cylindrical portion 34a2 is deformed inward in the radial direction is released, and the clamp force acting on the shaft 38b is eliminated. Consequently, the clamping state for the rotary shaft 39 is released.

Further, in the embodiment shown in the drawing, the leg segment 30b also includes a rotation detector 41 for detecting the rotational angle of the rotary shaft 39 (i.e., the angular position of the spindle unit 20) and an angle detector 42 for limiting the rotational range of the spindle unit 20.

The rotation detector 41 includes a pair of detector heads 41a, 41a disposed within the through hole 38a4 of the distributor 38a of the rotary joint 38, at predetermined positions on a disc-shaped support portion protruding from the inner peripheral surface of the through hole 38a4 outward in the radial direction, and a detector ring 41b which is attached to the shaft member 39a of the rotary shaft 39, and is disposed to face the inner sides of the detector heads 41a, 41a. A detection signal detected by the rotation detector 41 that indicates the angular position of the spindle unit 20 is sent to a control apparatus (not shown) of a machine tool in which the machining head 10 according to the present invention is installed. The detection signal is used for rotation control (numerical control) of the spindle unit 20.

The angle detector 42 is, for example, a limit switch, which is attached onto a support plate provided within the through hole 38a4 of the distributor 38a to face a peripheral surface of a disc-shaped member 43 attached to an end of the rotary shaft 39. The peripheral surface of the disc-shaped member 43 is provided with a dog that corresponds to a permissible angle range. When the angle detector 42 is opposed to the dog, the angle detector 42 is in an inoperative mode. Consequently, when the spindle unit 20 rotates to exceed a permissible angle due to, for example, control failure, the angle detector 42 detects the condition and sends a detection signal to the control apparatus of the machine tool as, for example, an emergency stoppage signal.

That is, the leg segments 30a, 30b rotatably retain the spindle unit 20 from both sides constitute an indexing device which indexes the spindle unit 20 around the A axis as a rotational center. The leg segment 30b also constitutes an indexing device provided with the clamp mechanism 34 with pressure fluid.

To be more specific, the leg segment 30b includes the housing 31b having the through hole 31b1 at the center thereof; the rotary shaft 39 (the flange member 39b and the rotary shaft 39a) extending through the through hole 31b1 and rotatably supported by the housing 31b; the shaft 38b provided with the rotary shaft 39a, separated from the rotational center (A axis) in the radial direction, and extending in the axial direction; the clamp sleeve 34a having the ring-shaped cylindrical portion 34a2 fitted around the outer periphery end of the shaft 38b; and the pressure-receiving member 34b having the cylindrical shape.

The ring-shaped clamp sleeve 34a includes the cylindrical portion 34a2 having the annular groove 34a1, and the flange portion 34a3 extending outward in the radial direction from the end of the cylindrical portion 34a2 and integrally provided with the cylindrical portion 34a2. The housing 31b has the attachment portion 31b3 having the engagement surface extending from the through hole 31b1 in the radial direction so as to accommodate the flange portion 34a3 of the clamp sleeve 34a. The pressure-receiving member 34b is attached such that the shaft end 34b4 of the pressure-receiving member 34b is coaxially inserted to engage with the flange portion 34a3 of the clamp sleeve 34a and is attached to the flange portion 34a3 of the clamp sleeve 34a via the screw members 34c2 serving as the plurality of clamp members screwed to the plurality of screw holes provided in the flange portion 34a3. The flange portion 34a3 of the clamp sleeve 34a is fixed to the housing 31b such that the flange portion 34a3 is attached to the attachment portion 31b3 of the housing 31b via the screw members 34c1 serving as the plurality of clamp members. In this way, the pressure-receiving member 34b is attached such that an outer peripheral surface 34b2 of the pressure-receiving member 34b is inserted to be fitted into an inner peripheral surface 31b4 of the through hole 31b1 of the housing 31b and attached to the attachment portion 31b3 of the housing 31b via the plurality of screw members 34c2 and the flange portion 34a3 of the clamp sleeve 34a.

Further, in an outer peripheral portion 34a6 of the clamp sleeve 34a, the annular groove 34a1 formed continuously over the entire circumference within an axial area of the outer peripheral portion 34a6 fitted to the inner peripheral surface 34b3 of the pressure-receiving member 34b defines the thin-wall portion 34a5. Also, the space surrounded by the annular groove 34a1 and the pressure-receiving member 34b defines the pressure chamber 34d communicating with the fluid control circuit (not shown) via the fluid channels 34b1, 34a4, 31b2. A predetermined gap 34d2 is provided between the inner peripheral surface 31b4 of the through hole 31b1 of the housing 31b and the outer peripheral surface 34b2 of the pressure-receiving member 34b. The metal material of the clamp sleeve 34a may be an alloy steel for machine structural use containing, for example, nickel or chromium. The metal materials of the rotary shaft 39, housing 31b, and pressure-receiving member 34b may be a steel product, for example, a carbon steel for machine structural use. A specific numerical range of the gap 34d2 is from a few dozen thousandths of millimeter to 1 millimeter.

The second support head component 50 of the machining head 10 will be described below in detail with reference to FIG. 4.

As mentioned above, in addition to the first support head component 30, the machining head 10 in the embodiment includes the second support head component 50 that supports the first support head component 30. The first support head component 30 is attached to the ram 8 which supports a main-shaft head of the machine tool through the second support head component 50. The second support head component 50 is provided for rotating the first support head component 30 around an axis line (axis line parallel to the Z axis of the machine tool, referred to as "C axis" hereinafter) extending in the vertical direction (FIG. 4).

The second support head component 50 includes a housing 51 as a main body. The housing 51 has a through hole 51a that extends along the C axis. The second support head component 50 also includes a rotary shaft 52 whose shaft member 52a is disposed within the through hole 51a. The first support head component 30 is joined to the second support head component 50 through the rotary shaft 52. The second support head component 50 is attached to the ram 8 which supports the main-shaft head of the machine tool through an annular supporter 51b attached to the housing 51.

The second support head component 50 includes a DD motor 53 for rotationally driving the rotary shaft 52, a clamp sleeve 54 for retaining the rotational position of the rotary shaft 52, and a rotary joint 55 for supplying fluid to the first support head component 30, which are all disposed within the through hole 51a of the housing 51.

The DD motor 53 is constituted by a stator 53a fixed to the housing 51 through a stator sleeve 53c, and a rotor 53b fixed to the rotary shaft 52 at a position facing an inner peripheral surface of the starter 53a. An exciting current for driving the DD motor 53 is supplied by a cable 17 connected to the stator 53a through a connector 17a.

The rotary shaft 52 includes the shaft member 52a disposed rotatably within the through hole 51a of the housing 51, and a flange member 52b attached to an end of the shaft member 52a proximate to the first support head component 30 and extending outward radially (in directions perpendicular to the C axis). The rotary shaft 52 has a through hole 52c through which the rotary joint 55 extends.

As shown in the figure, the shaft member 52a and the flange member 52b of the rotary shaft 52 have a bearing housing 52d therebetween. The bearing housing 52d and the housing 51 have a bearing 56 interposed therebetween. With the bearing 56, the rotary shaft 52 is supported in a rotatable manner relative to the housing 51. The bearing 56 in the embodiment in FIG. 3 is a triple cylindrical roller bearing (triple roller bearing/axial-radial roller bearing), which is a type of compound-roller pivot bearing, and is capable of receiving large amounts of load in the axial and radial directions.

The rotor 53b of the DD motor 53 is fitted around the outer peripheral surface of the shaft portion 52a. When the rotor 53b rotates, the shaft portion 52a is rotationally driven around the C axis. The flange member 52b is joined to the shaft member 52a with a plurality of screw members 52e arranged in the circumferential direction and thus rotates together with the shaft member 52a. Furthermore, the flange member 52b has a plurality of screw members 19 screwed thereto in the circumferential direction. With the screw members 19, the supporting segment 30c of the first support head component 30 is joined to the flange member 52b. Accordingly, when the DD motor 53 rotationally drives the rotary shaft 52, the first support head component 30 is rotated together with the rotary shaft 52.

The rotary joint 55 is similar to the rotary joints 37, 38 in the first support head component 30, and includes a distributor 55a fixed to the housing 51 and a shaft 55b rotatably fitted into a through hole 55a1 provided in the distributor 55a and disposed concentrically with the distributor 55a along the C axis.

The distributor 55a is constituted by a cylindrical portion 55a2 disposed within the through hole 52c of the rotary shaft 52 and a flange portion 55a3 extending outward radially from an end of the cylindrical portion 55a2 farthest from the first support head component 30. The flange portion 55a3 of the distributor 55a is joined to the housing 51 with a plurality of screw members arranged in the circumferential direction.

Also, the shaft 55b is joined to a disc-shaped flange member 57 at an end thereof proximate to the first support head component 30. The shaft 55b is joined to the flange member 52b of the rotary shaft 52 through the flange member 57. Consequently, the shaft 55b rotates together with the rotary shaft 52. The flange member 57 has a shape that can be fitted to a circular recess 30c1 provided in the supporting segment 30c of the first support head component 30. With the flange member 57 and the recess 30c1 of the supporting segment 30c, the first support head component 30 and the second support head component 50 can be properly positioned with respect to each other when being joined to each other.

The distributor 55a has a plurality of fluid channels 55a4 arranged at different positions in the circumferential direction. The fluid channels 55a4 are provided for taking in fluid from the outside. On the other hand, the shaft 55b has a plurality of fluid channels 55b1 that correspond to the fluid channels 55a4 of the distributor 55a. Fluid channels 55b1 are arranged at different positions in the circumferential direction.

The fluid channels 55a4 and the fluid channels 55b1 corresponding thereto communicate with each other through annular grooves extending around an engagement surface between the distributor 55a and the shaft 55b. This communication state is maintained even upon rotation of the shaft 55b. Also, the plurality of fluid channels 55b1 provided in the shaft 55b communicate with the corresponding fluid channels 37a3 or 38a3 provided in the distributor 37a or 38a of the rotary joint 37 or 38 of the first support head component 30. Accordingly, fluid supplied to the distributor 55a of the rotary joint 55 from the outside is sent to the rotary joints 37 and 38 of the first support head component 30 via the shaft 55b.

The distributor 55a fixed to the housing 51 and the shaft member 52a of the rotary shaft 52 have the clamp sleeve 54 disposed therebetween for retaining the rotational position of the rotary shaft 52. The clamp sleeve 54 has a flange portion 54a at which the clamp sleeve 54 is joined to the distributor 55a with a plurality of screw members, and is rotatable relative to the rotary shaft 52. The clamp sleeve 54 has a cylindrical portion 54b provided with an annular groove 54c which is open toward the cylindrical portion 55a2 of the distributor 55a. The annular groove 54c and the outer peripheral surface of the cylindrical portion 55a2 of the distributor 55a form a pressure chamber.

When pressure fluid is supplied to the pressure chamber through a fluid channel 54d provided in the distributor 55a, a thin-wall section of the cylindrical portion 54b, which corresponds to the annular groove 54c of the cylindrical portion 54b, is deformed in a diameter-increasing direction (i.e., outward in the radial direction) of the cylindrical portion 54b. As a result, a clamping force acts on the rotary shaft 52 in the radially-outward direction, whereby a state is attained in which the rotary shaft 52 is prevented from rotating (clamping state).

In the illustrated embodiment, an upper end portion of the rotary joint 55 is provided with a rotation detector 44 for detecting the amount of rotation of the rotary shaft 52, namely, the amount of rotation of the first support head component 30. The rotation detector 44 includes a pair of detector heads 44a, 44a disposed at predetermined positions on the distributor 55a, and a detector ring 44b which is attached to the shaft 55b rotatable together with the rotary shaft 52 so as to face the detector heads 44a, 44a. Similar to the rotation detector 41 in the first support head component 30, a detection signal of the rotation detector 44 is sent to the control apparatus of the machine tool and is used for rotation control of the first support head component 30.

In the machining head 10 having the above-described configuration, the support head component (the first support head component 30) for supporting the spindle unit 20 sandwiches the spindle unit 20 between the two support shafts of the pair of leg segments 30a and 30b so as to securely support the spindle unit 20 in a non-rotatable manner relative to the two support shafts. Using the DD motor 33 to rotate the driving support shaft of the leg segment 30a, the spindle unit 20 is rotated about the rotary axis line of the support shafts (i.e., axis line or A axis extending perpendicular to the rotary axis line of the spindle 21) to a desired angular position.

When the spindle 21 of the spindle unit 20 is driven to be positioned at a desired angle around the A axis, the rotary shaft 32 (the rotary shaft 39) is rotationally driven by the DD motor 33 whose amount of rotation is controlled by the control apparatus of the machine tool. The DD motor 33 is driven in accordance with numerical control based on a preliminarily set program. The rotation of the rotor 33a is controlled by selectively exciting an electromagnet (not shown) of the stator 33b. Accordingly, the angular position of the spindle unit 20 is controlled via the driving support shaft (the rotary shaft 32 and the shaft 37b). Consequently, the DD motor 33 and the driving support shaft (i.e., the rotary shaft 32 and the shaft 37b) linked with the DD motor 33 within the leg segment 30a function as an indexing mechanism for the spindle unit 20. An exciting current for driving the DD motor 33 is supplied by a cable 16 connected to the DD motor 33 through a connector 16a.

When such driving for indexing the rotary shaft 32 (the rotary shaft 39) is completed, a clamping operation is carried out in which the pressure chamber 34d is supplied with the pressure oil from the fluid control circuit (not shown) including, for example, a pressure fluid supply source and an on-off valve, through the fluid channels 31b2. At this time, the thin-wall portion 34a5 of the pressure chamber 34d expands inward in the radial direction with respect to the A axis and presses an outer periphery end 38b2 of the shaft 38b. Accordingly, the rotary shaft 39 is held in a non-rotatable manner relative to the housing 31b.

In addition, a pressure is applied to the pressure-receiving member 34b which is a part of the pressure chamber 34d. Thus, the pressure-receiving member 34b is deformed in the diameter-increasing direction (i.e., outward in the radial direction). During a clamping operation, the pressure force of the pressure oil acts outward in the radial direction with respect to the inner peripheral surface 34b3 of the pressure-receiving member 34b. Accordingly, the pressure-receiving member 34b also expands in the same direction. However, since the predetermined gap 34d2 is provided between the inner peripheral surface 31b4 of the through hole 31b1 of the housing 31b accommodating the pressure-receiving member 34b, and the outer peripheral surface 34b2 of the pressure-receiving member 34b, no pressure force (interaction force) is applied to the through hole 31b1 of the housing 31b at least until the outer peripheral surface 34b2 of the expanding pressure-receiving member 34b contacts the inner peripheral surface 31b4 of the through hole 31b1. Also, the energy of the pressure force of the pressure oil is absorbed when the pressure-receiving member 34b is deformed in an expanding manner. Hence, even when the pressure-receiving member 34b expands, the gap 34d2 is no longer left, and the pressure-receiving member 34b contacts the inner peripheral surface 31b4, a distortion, which has been generated in the housing 31b serving as the frame during a clamping operation, is markedly decreased because the pressure force applied by the pressure-receiving member 34b to the through hole 31b1 of the housing 31b is greatly decreased as compared with related art. Thus, a positional shift of the machining head (spindle) occurring when the rotary shaft 39 is inclined as a result of transmission of a distortion of the housing 31b to the support structure of the bearing 36 can be decreased. Processing with a higher precision (high-precision processing) can be carried out for a workpiece.

The first embodiment described above may be modified as follows. In the support head component (the first support head component 30) of the machining head 10 according to the first embodiment, only one of the pair of leg segments 30a, 30b for supporting the spindle unit 20 is provided with the indexing mechanism (DD motor 33) for rotationally driving the spindle unit 20. Alternatively, both leg segments of the support head component may be provided with indexing mechanisms (DD motors), and the present invention may be applied to both indexing mechanisms. Other indexing mechanism, for example, the clamp mechanism (the clamp sleeve 54) of the second support head component 50 which rotationally drives the first support head component 30 around the C axis may have the above-described configuration.

In the first embodiment, the screw holes are made in the shaft end 34b4 of the pressure-receiving member 34b along the A axis. The pressure-receiving member 34b is fixed to the clamp sleeve 34a with the screw members 34c2 extending through the flange portion 34a3 and being screwed into the screw holes. The predetermined gap 34d2 is provided between the pressure-receiving member 34b and the through hole 31b1 of the housing 31b to take into account the distortion of the pressure-receiving member 34b occurring when the pressure oil is supplied. Hence, the pressure force applied from the pressure-receiving member 34b to the through hole 31b1 of the housing 31b can be markedly decreased. However, when the pressure-receiving member 34b is deformed, the distortion of the screw member 34c2 may be transmitted to the housing 31b via the attachment seat 31b3. The distortion may affect the support structure of the bearing 36. Consequently, the distortion may affect the rotary shaft 39 (in particular, the A axis, which is the axis line of the rotary shaft 39, may be inclined). Accordingly, it is desirable to provide a configuration that prevents the distortion of the pressure-receiving member 34b from being transmitted to the housing 31b serving as the frame.

Figure 6:
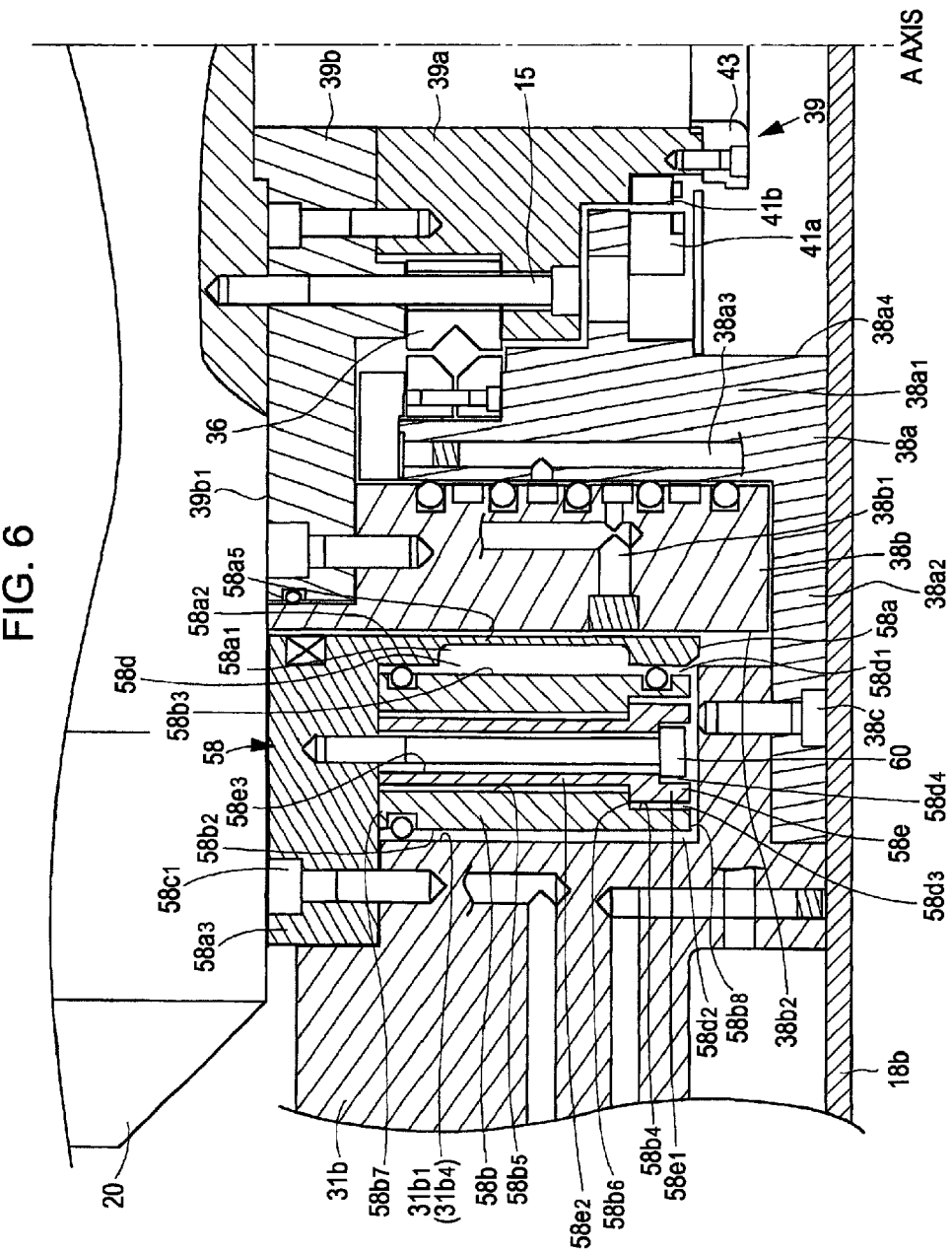
FIG. 6 is an enlarged front partially-cutaway view showing a primary portion of a clamp mechanism in a machining head according to another embodiment of the present invention.

In light of this, FIG. 6 illustrates a further preferable clamp mechanism 58 according to a second embodiment. The clamp mechanism 58 in FIG. 6 is made by improving the configuration of the first embodiment (the structure in which the pressure-receiving member 34b is attached to the flange portion 34a3). A loose-fit member having a predetermined gap is interposed between a pressure-receiving member and a screw member. Even when the pressure-receiving member is deformed outward in the radial direction during a clamping operation, at least one of gaps between the pressure-receiving member, loose-fit member, and screw member is changed to absorb the deformation. Accordingly, an interaction force in a horizontal direction (that is, outward in the radial direction of the A axis) is hardly transmitted to the screw member as compared with related art.

Herein, specific components of the clamp mechanism 58, in particular, a clamp sleeve 58a, an annular groove 58a1, a cylindrical portion 58a2, a flange portion 58a3, and a screw member 58c1 are similar to the clamp sleeve 34a, the annular groove 34a1, the cylindrical portion 34a2, the flange portion 34a3, and the screw member 34c1 according to the first embodiment (FIG. 5). In the first embodiment, the pressure-receiving member has the screw holes to which the screw members are inserted and the clamp sleeve has the through holes, through which the screw members extend, arranged in the circumferential direction at an interval. In the second embodiment, the relationship between the through holes and the screw holes is inverted. That is, the second embodiment is different from the first embodiment in that the pressure-receiving member has the through holes whereas the clamp sleeve has the screw holes. The through holes of the pressure-receiving member have bottoms. The pressure-receiving member is attached via loose-fit members fitting to the through holes. A predetermined gap is provided between an inner periphery end of each through hole of the pressure-receiving member and an outer periphery end of each loose-fit member.

Referring to FIG. 6, a cylindrical pressure-receiving member 58b is disposed to be fitted around the cylindrical portion 58a2 of the clamp sleeve 58a. The pressure-receiving member 58b has a plurality of bottomed through holes 58b2 extending in parallel to the A axis are provided in the circumferential direction at an interval. The through holes 58b2 accommodate loose-fit members 58e. The through holes 58b2 of the pressure-receiving member 58b each have a large-diameter section 58b4 and a small-diameter section 58b5 whose diameter is smaller than that of the large-diameter portion 58b4 and communicating with the flange portion 58a3, in that order from the shaft end 58b8. The through hole 58b2 also has a bottom portion 58b6 extending in the radial direction to be continuously arranged between the large-diameter section 58b4 and the small-diameter section 58b5.

Each of the cylindrical loose-fit members 58e has an outer periphery defined by an engagement portion 58e1 having a diameter smaller than an inner diameter of the large-diameter section 58b4 of the pressure-receiving member 58b and having an engagement surface capable of engaging with the bottom portion 58b6, and by a shaft portion 58e2 having a diameter smaller than an inner diameter of the small-diameter portion 58b5 of the pressure-receiving member 58b and extending toward an shaft end 58b7. The loose-fit member 58e also has a bottomed through hole 58e3 extending along the A axis so as to receive a screw member 60. A bottom portion of the through hole 58e3 of the loose-fit member 58e is provided at a depth so that the inserted screw member 60 can press the pressure-receiving member 58b to the flange portion 58a3 of the clamp sleeve 58a via the loose-fit member 58e. The pressure-receiving member 58b is disposed to be fitted around the cylindrical portion 58a2 of the clamp sleeve 58a. The loose-fit member 58e and the screw member 60 are inserted to each of the plurality of through holes 58b2 of the pressure-receiving member 58b. The pressure-receiving member 58b is fixed to the flange portion 58a3 of the clamp sleeve 58a by screwing the screw member 60 into a screw hole (not shown) of the flange portion 58a3.

Further, a predetermined gap 58d3 is provided between the through hole 58b2 of the pressure-receiving member 58b and an outer periphery end of the loose-fit member 58e (the engagement portion 58e1 and the shaft portion 58e2) to take into account the deformation of the pressure-receiving member 58b during a clamping operation.

That is, in the second embodiment, the bottom portion 58b6 serving as the engagement surface extending outward in the radial direction is provided near the shaft end 58b8 of the pressure-receiving member 58b opposite to the shaft end 58b7 engaging with a side proximate to the housing 31b. A clamp member is defined by the loose-fit member 58b having the engagement surface (the bottom portion 58b6) engaging with the shaft end 58b8 opposite to the engaging shaft end 58b7, and the screw member 60 provided at the through hole 58e3 of the loose-fit member 58b proximate to the shaft end 58b8 and engaging with the bottom portion 58b6. The pressure-receiving members 58b are attached to the housing 31b by screwing the screw members 60 into the plurality of screw holes provided in the flange portion 58a3 of the clamp sleeve 58a at the housing 31b while the engagement surfaces of the plurality of loose-fit members 58e engage with the pressure-receiving member 58b. The predetermined gap 58d3 is provided between the pressure-receiving member 58*b* and a surface (i.e., the engagement portion 58*e*1 and the shaft portion 58*e*2, that is an outer periphery end) of each screw member 60 facing the pressure-receiving member (58*b*) at the center side (A axis) of the rotary shaft 39.

In other words, the engagement member is formed of the loose-fit member 58*e* which has at the outer periphery thereof a step surface serving as the engagement surface extending outward in the radial direction, and the through hole 58*e*3 to which the screw member 60 can be inserted. The pressure-receiving member 58*b* has the plurality of bottomed through holes 58*b*2 which can engage with the engagement surfaces (bottom portions 58*b*5) of the loose-fit member 58*e*, the through holes 58*b*2 extending from the end surfaces 58*b*8 opposite to the end surfaces 58*b*7 engaging with the housing 31*b* and arranged in the circumferential direction at an interval. The pressure-receiving member 58*b* is attached to the housing 31*b* by screwing the plurality of screw members 60, respectively inserted into the loose-fit members 58*e*, into the plurality of screw holes provided in the housing 31*b* while the loose-fit members 58*e* are respectively inserted into the plurality of bottomed through holes 58*b*2. The predetermined gap 58*d*3 is provided between the inner peripheral surface of each through hole 58*b*2 of the pressure-receiving member 58*b* and the outer peripheral surface of each loose-fit member 58*e* (the engagement portion 58*e*1 and the shaft portion 58*e*2, that is the outer periphery end).

The gap 58*d*3 is determined properly on account of the deformation of the pressure-receiving member 58*b* during a clamping operation. A specific numerical range of the gap 58*d*3 is from a few dozen thousandths of millimeter to 1 millimeter. Also, the gap 58*d*4 is provided between the inner peripheral surface of the through hole 58*e*3 of the loose-fit member 58*e* and the outer periphery end of the screw member 60, the gap 58*d*4 having a size to allow smooth insertion of the screw member 60. A specific numerical range of the gap 58*d*4 is from a few dozen thousandths of millimeter to 1 millimeter.

With the second embodiment, even when the pressure-receiving member 58*b* expands outward in the radial direction upon supply of the pressure oil, in the pressure-receiving member 58*b*, the relative positions of the engagement surface (bottom portion 58*d*6) and the screw member 60 are changed until the gap between the outer peripheral surface of the screw member 60 facing the center side of the rotary shaft 58 and the pressure-receiving member 58*b* is no longer left, in other words, until the gap 58*d*3 between the inner peripheral surface of the through hole (58*b*4 and 58*b*5) of the pressure-receiving member 58*b* and the outer peripheral surface (the engagement portion 58*e*1 and the shaft portion 58*e*2, that is the outer periphery end) of the loose-fit member 58*e* or the gap 58*d*4 between the through hole 58*e*3 of the loose-fit member 58*e* and the outer periphery end of the screw member 60 is no longer left. Thus, a pressure force in a direction to incline (bend) the screw member 60, which presses the pressure-receiving member 58*b* via the loose-fit member 58*e*, is eliminated or markedly decreased as compared with related art. Accordingly, an angular shift of a workpiece and a positional shift (angular shift) of a machining head caused by the frame being distorted when the pressure fluid, such as pressure oil, is supplied can be decreased unlike related art. Therefore, high-precision processing can be carried out for a workpiece. It is to be noted that the gap 58*d*2 in FIG. 6 may be provided in a similar manner to the gap 34*d*2 of the first embodiment.

In the second embodiment, the loose-fit members having the step surfaces are inserted to the plurality of bottomed through holes provided in the pressure-receiving member 58*b*, and the screw members cause the pressure-receiving member to press the flange of the clamp sleeve. However, the form of the engagement surface provided at the pressure-receiving member and the form of the engagement member engaging therewith are not limited to the above-described configuration. In a third embodiment, an engagement member serving as a clamp member to press a pressure-receiving member is a washer. A predetermined gap is provided between the pressure-receiving member and the surface of the screw member facing the pressure-receiving member at the center side (A axis) of the rotary shaft. Accordingly, even when the pressure-receiving member is deformed outward in the radial direction during a clamping operation, the gap between the pressure-receiving member and the screw member is changed, thereby absorbing the deformation. Hence, similar to the second embodiment, an interaction force is not horizontally transmitted (that is, outward in the radial direction of the A axis) to the screw member (FIG. 7).

Figure 7:
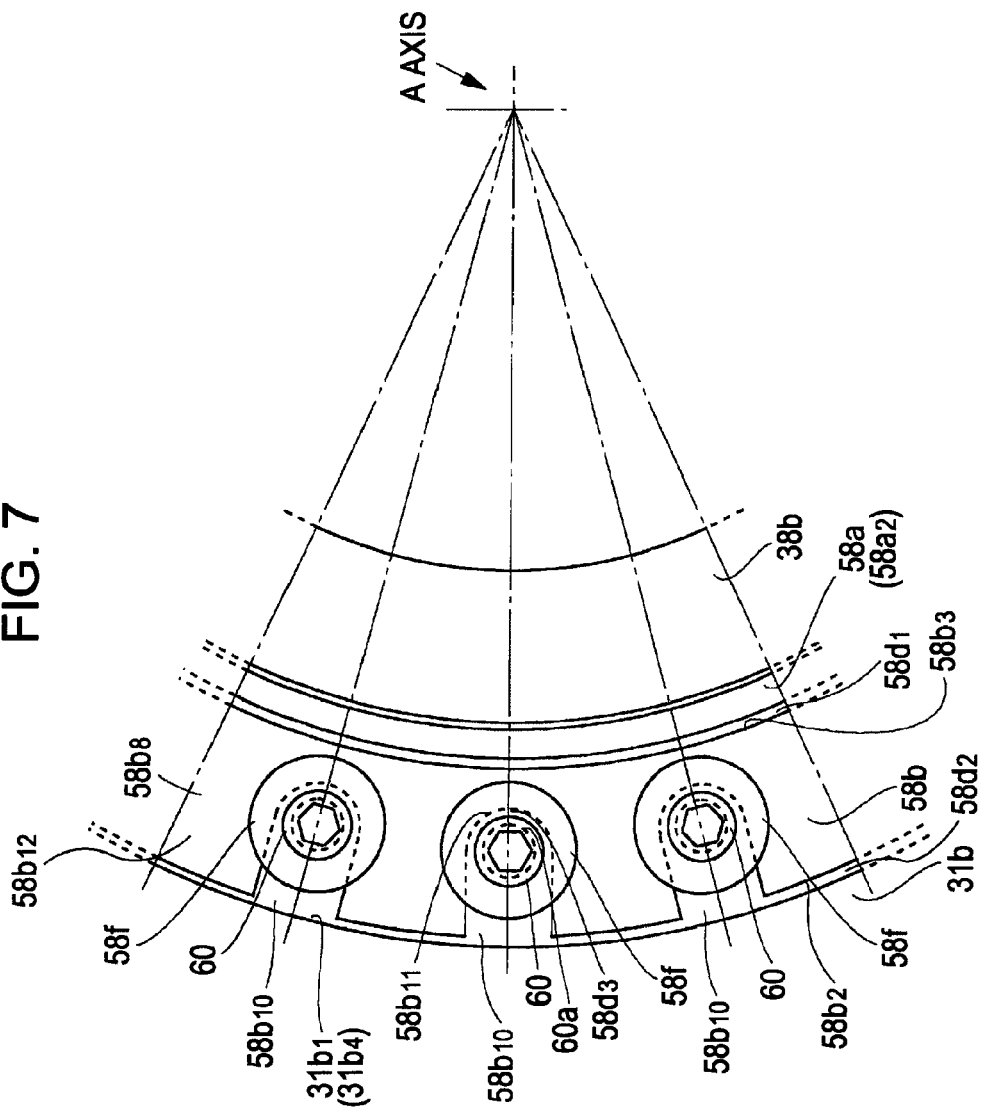
FIG. 7 is an enlarged bottom view showing a primary portion of a clamp mechanism in a machining head according to still another embodiment of the present invention, and more particularly, is a view from a side proximate to a shaft end 58b8 of a pressure-receiving member 58b in FIG. 6.

FIG. 7 schematically shows a peripheral portion of the pressure-receiving member and the clamp sleeve according to the third embodiment. In FIG. 6, the peripheral portion of the pressure-receiving member 58*b* is viewed from the side of the shaft end 58*b*8. The components having similar functions to those of the second embodiment refer numerals similar to those in FIG. 6, and the redundant detailed description will be omitted.

Referring to FIG. 7, a cylindrical pressure-receiving member 58*b* has through holes 58*b*10 capable of receiving shaft portions 60*a* of screw members 60, the through holes 58*b*10 being arranged in the circumferential direction at an interval. The pressure-receiving member 58*b* is attached to a flange portion (not shown) of the clamp sleeve 58*a* with a plurality of screw members 60, which are inserted to the through holes 58*b*10, and a plurality of washers 58*f*. A shaft end 58*b*8 of the pressure-receiving member 58*b* has an engagement surface 58*b*12 which has a planer shape extending outward in the radial direction. The ring-shaped washer 58*f* functioning as the engagement member has a planer shape so that a shaft end surface thereof serves as an engagement surface. The shaft portion 60*a* of the screw member whose tip end has an external thread is inserted into the through hole of the washer 58*f*, and then the through hole 58*b*10 of the pressure-receiving member 58*b*, and is screwed to a corresponding screw hole provided at the flange portion (not shown) of the clamp sleeve 58*a*. In this way, the pressure-receiving member 58*b* is pressed to the flange portion (not shown) of the clamp sleeve 58*a* by the plurality of screw members 60 and the plurality of washers 58*f* arranged in the circumferential direction at an interval. Thusly, the pressure-receiving member 58*b* is attached to the flange portion.

The pressure-receiving member 58*b* is arranged between the outer peripheral surfaces of the shaft portions 60*a* of the screw members 60, each defining the clamp member, and inner periphery ends 58*b*11 of the long through holes 58*b*10 of the pressure-receiving member 58*b* such that gaps 58*d*3 are provided in a manner similar to the second embodiment. Thusly, the pressure-receiving member 58*b* is attached to the flange portion. As described above, the clamp sleeve 58*a* with the pressure-receiving member 58*b* attached is inserted into the through hole 31*b*1 in a similar manner to the second embodiment. The flange portion 58*a*3 is fixed to an attachment seat (not shown) of the housing 31*b* with a plurality of screw members. A gap 58*d*2 is provided between the inner peripheral surface 31*b*4 of the housing 31*b* and the outer peripheral surface 58*b*2 of the pressure-receiving member 58*b* in a manner similar to the first embodiment.

In other words, in the apparatus shown in FIG. 7, the shaft end 58b8 of the pressure-receiving member 58b opposite to the shaft end engaging with the housing has the engagement surface 58b12 extending outward in the radial direction, and the clamp member is defined by the washer 58f and the screw member 60 engaging with the washer 58f, the washer 58f serving as the engagement member having the engagement surface engaging with the shaft end 58b8 of the pressure-receiving member 58b opposite to the engaging shaft end. The pressure-receiving member 58b is attached to the housing 31b through the clamp sleeve 58a by screwing the screw members 60 into screw holes (not shown) provided in the flange portion 58a3 of the clamp sleeve 58a at the housing 31b while the engagement surfaces of the washers 58f engage with the pressure-receiving member 58b. In addition, the predetermined gap 58d3 is provided between the pressure-receiving member 58b and the outer periphery end of the shaft portion 60a, which is the surface of the screw member 60 facing the rotational center (A axis).

With the third embodiment, even when the pressure-receiving member 58b expands outward in the radial direction upon supply of the pressure oil, in the pressure-receiving member 58b, the relative positions of the engagement surface and the screw member 60 are changed until the gap 58d3 between the outer peripheral surface of the shaft portion 60a of the screw member 60 facing the center side of the rotary shaft (A axis) and the pressure-receiving member 58b is no longer left. Thus, a pressure force in a direction to incline (bend) the screw member 60, which presses the pressure-receiving member 58b via the washer 58f, is eliminated or markedly decreased as compared with related art. Thus, an angular shift of a workpiece and a positional shift (angular shift) of a machining head caused by the frame being distorted when the pressure fluid, such as pressure oil, is supplied can be decreased unlike related art. High-precision processing can be carried out for a workpiece.

While the first to third embodiments employ the configuration in which the drive source of the rotary shaft 39 is the DD motor, the drive source may be other motor or rotary driving mechanism.

In the first to third embodiments, while the indexing mechanism of the spindle unit 20 to which the tool is attached is installed in the machining head for the machine tool, the indexing mechanism may be applied to other indexing device. For example, the indexing device (that is, rotary table) may include the rotary shaft for indexing the angle of a table on which a workpiece is mounted. For example, using the first embodiment (FIG. 5) as an example, the spindle unit 20 is omitted, the end surface 39b1 of the flange member 39b of the rotary shaft is formed as a flat plane without a step, and the screw member 15 for coupling the shaft member 39a, the bearing 36, and the flange member 39b is screwed into the shaft member 39a so as to be buried into the flange member 39b from the end surface 39b1. The end surface 39b1 provided as the flat plane of the flange member 39b serves as a table surface of the rotary table on which a jig (not shown) for fixing a workpiece is mounted. In the first embodiment (FIG. 5), while a mechanism for rotationally driving the rotary shaft 39 being integral with the table surface is not provided. Like a known rotary table, a worm wheel may be integrally provided at the rotary shaft 39a, and a worm spindle, linked with a servomotor which can control, for example, the amount of rotation, may mesh with the worm wheel. Alternatively, a DD motor may rotationally drive the rotary shaft 39 like the leg segment 30a of the first embodiment.

In the embodiment shown in FIG. 5, the clamp sleeve 34a is fixed to the housing 31b and the pressure-receiving member 34b at the position of the flange portion 34a3 with the screw members 34c1, 34c2, however, a non-flange-side end portion of the clamp sleeve 34a is not attached to the fixed member being integral with the housing 31b.

Owing to this, a large torque acts in a rotation direction of the rotary shaft 39 by a reaction force applied from the machining head during processing, such as cutting, of a workpiece, when the rotary shaft 39 is clamped by the clamp mechanism 34. When the clamp sleeve 34a fixed to the housing 31b and retaining the rotary shaft 39 receives the large torque, the cylindrical portion 34a between the thin-wall section 34a5 and the flange portion 34a3 may be twisted, or distorted in the circumferential direction. The distortion in the circumferential direction is negligible at the position of the flange portion 34a3 fixed to the housing 31b as the frame, with reference to the position of the flange portion 34a3 in the circumferential direction. However, the distortion may gradually increase from the flange portion 34a3 toward the thin-wall section 34a5 in the axial direction. The distortion may become noticeable at the position of the thin-wall section 34a5 which expands with supply of the pressure oil and presses the cylinder portion 38b. The distorted amount (twisted amount) in the circumferential direction increases if an indexing device has a larger distance between the flange portion 34a3 and the thin-wall section 34a5. As a result, the machining precision for a workpiece may be degraded, and metal fatigue may likely occur at the cylindrical portion 34a and the thin-wall section 34a5 which is a part thereof.

FIGS. 8 to 12 show embodiments for locking the non-flange-side end portion of the cylindrical portion 34a2 of the clamp sleeve 34a so as to be non-rotatable relative to the pressure-receiving member 34b with a higher rigidity than that of the clamp sleeve 34a, in order to decrease a noticeable distortion at the position of the thin-wall section 34a5. For example, the pressure-receiving member 34b may be increased in rigidity by using a material with a high rigidity, or by having a thickness larger than that of the cylindrical portion 34a2.

Figure 8:
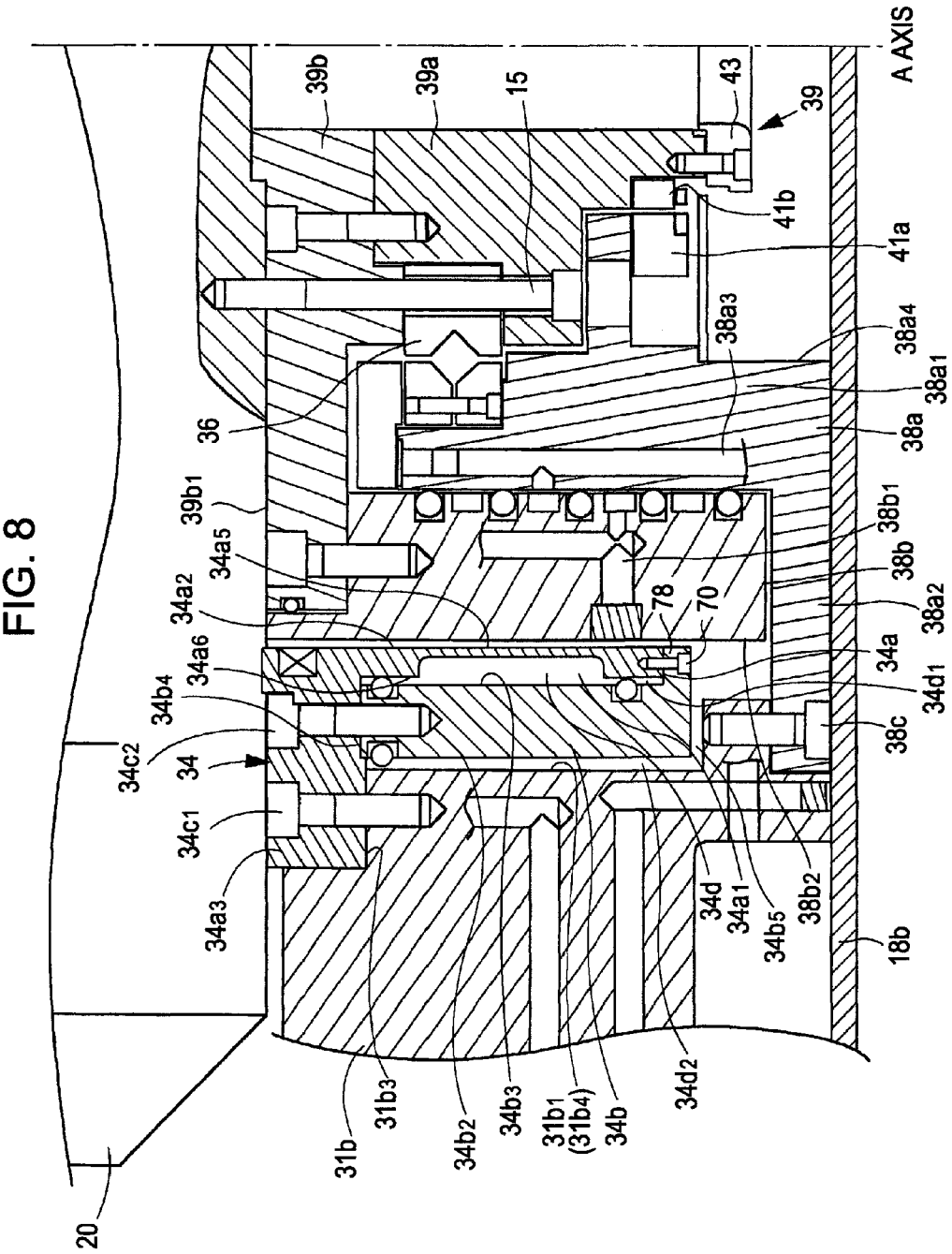
Figure 9:
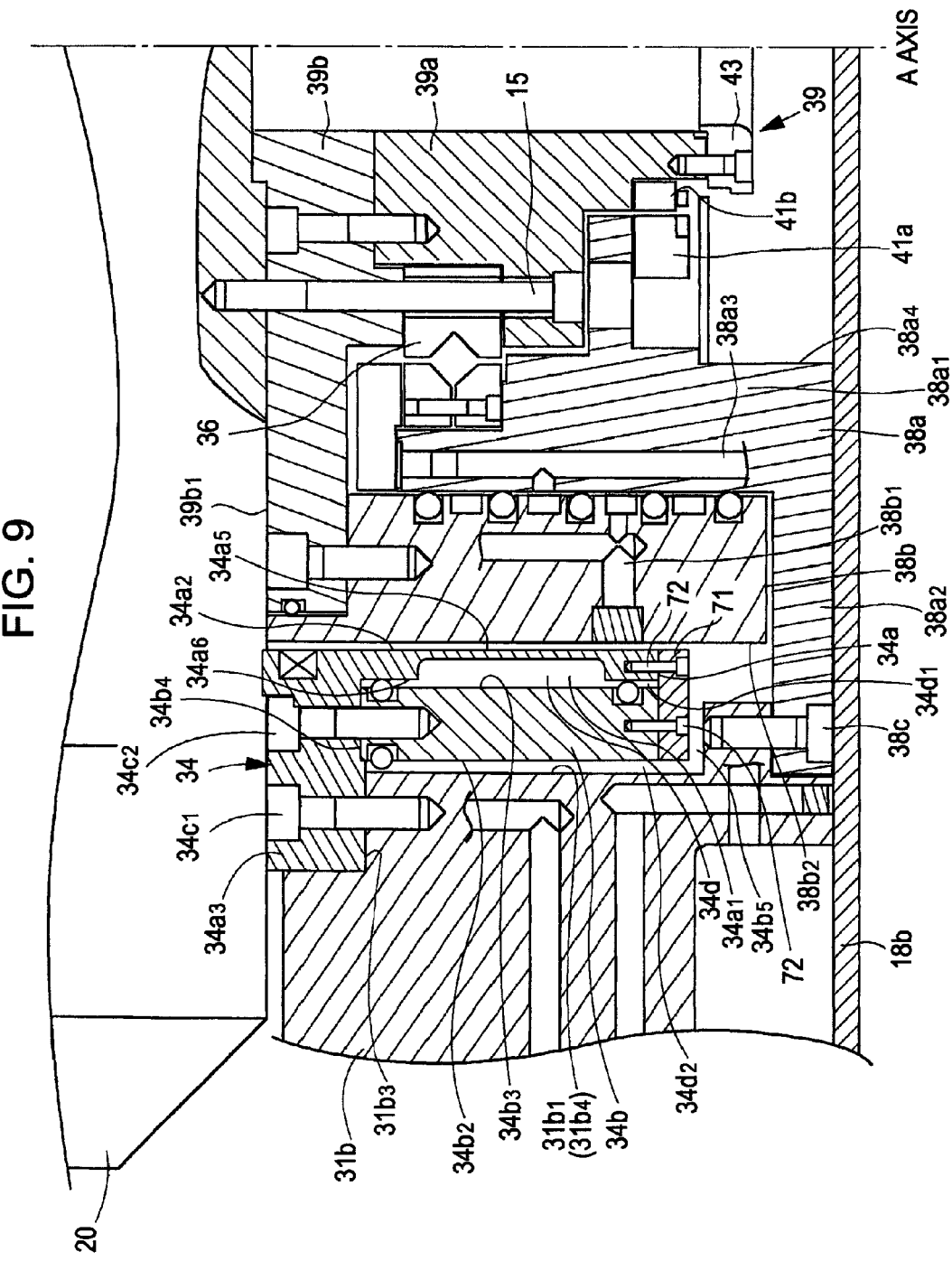
Figure 10:
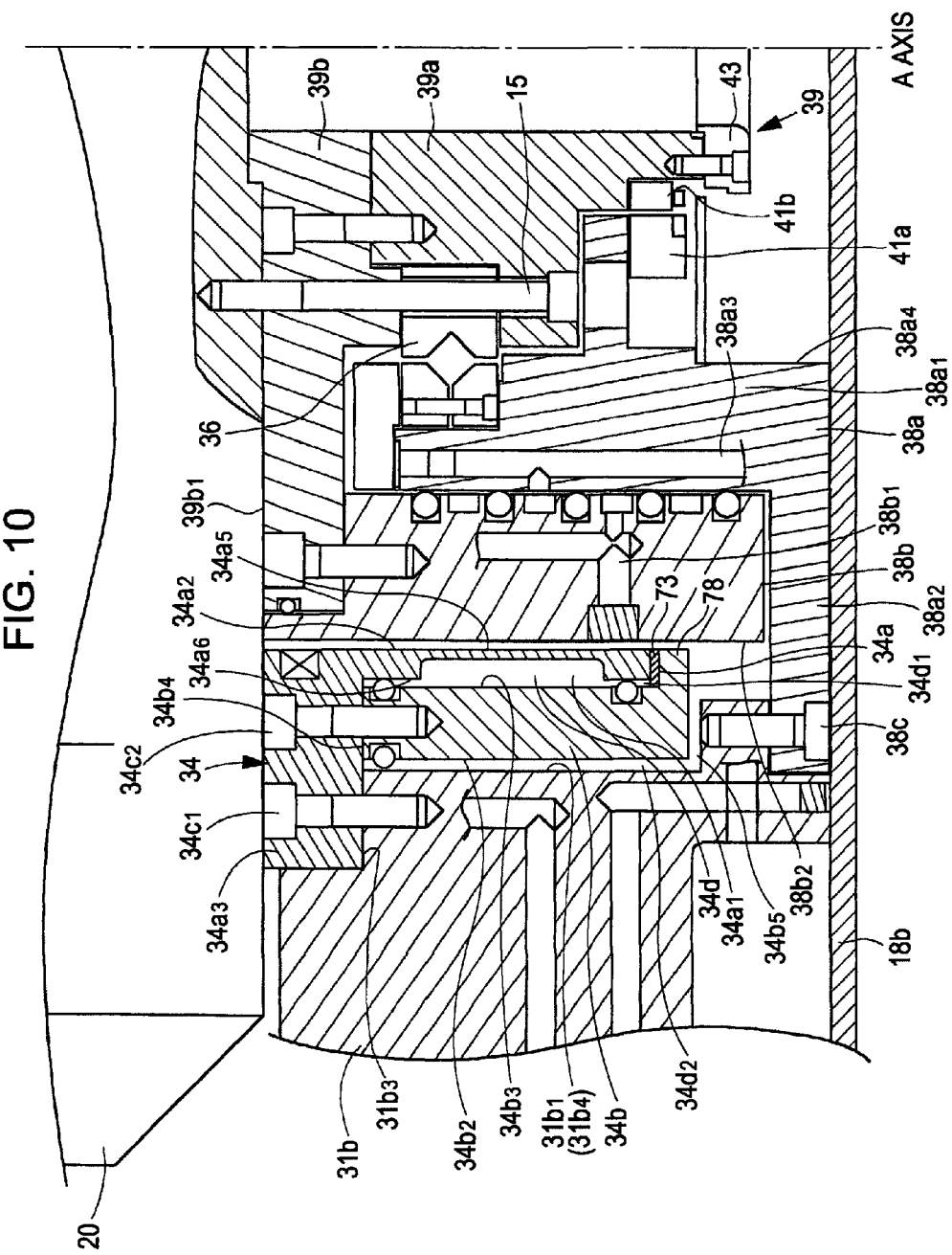

FIG. 8 shows an embodiment of a structure in which a bottom portion 78 serving as a lock end of the clamp sleeve 34a is provided at the non-flange-side end portion of the pressure-receiving member 34b to protrude inward in the radial direction from an inner peripheral surface, and the non-flange-side end portion of the cylindrical portion 34a2 is attached to the bottom portion 78 with a screw 70. FIG. 9 shows an embodiment of a structure in which an annular plate 71 is provided to contact the non-flange-side end surface of the cylindrical portion 34a2 and contact an end surface of the pressure-receiving member 34b, and the pressure-receiving member 34b is coupled with the cylindrical portion 34a2 with the plate 71 and two screws 72. FIG. 10 shows an embodiment of a structure in which, while the pressure-receiving member 34b is fixed to the flange portion 34a3 of the clamp sleeve 34a with the plurality of screw members 34c2, a plurality of spacers 73, each having an arcuate external shape and a wedge-shaped cross section, are arranged in the circumferential direction and press-fitted to a space between the non-flange-side end portion of the cylindrical portion 34a2 and the annular bottom portion 78 of the pressure-receiving member 34b, so that the plurality of spacers 73 frictionally lock the cylindrical portion 34a2 with respect to the pressure-receiving member 34b in an interference fit manner.

Figure 11:
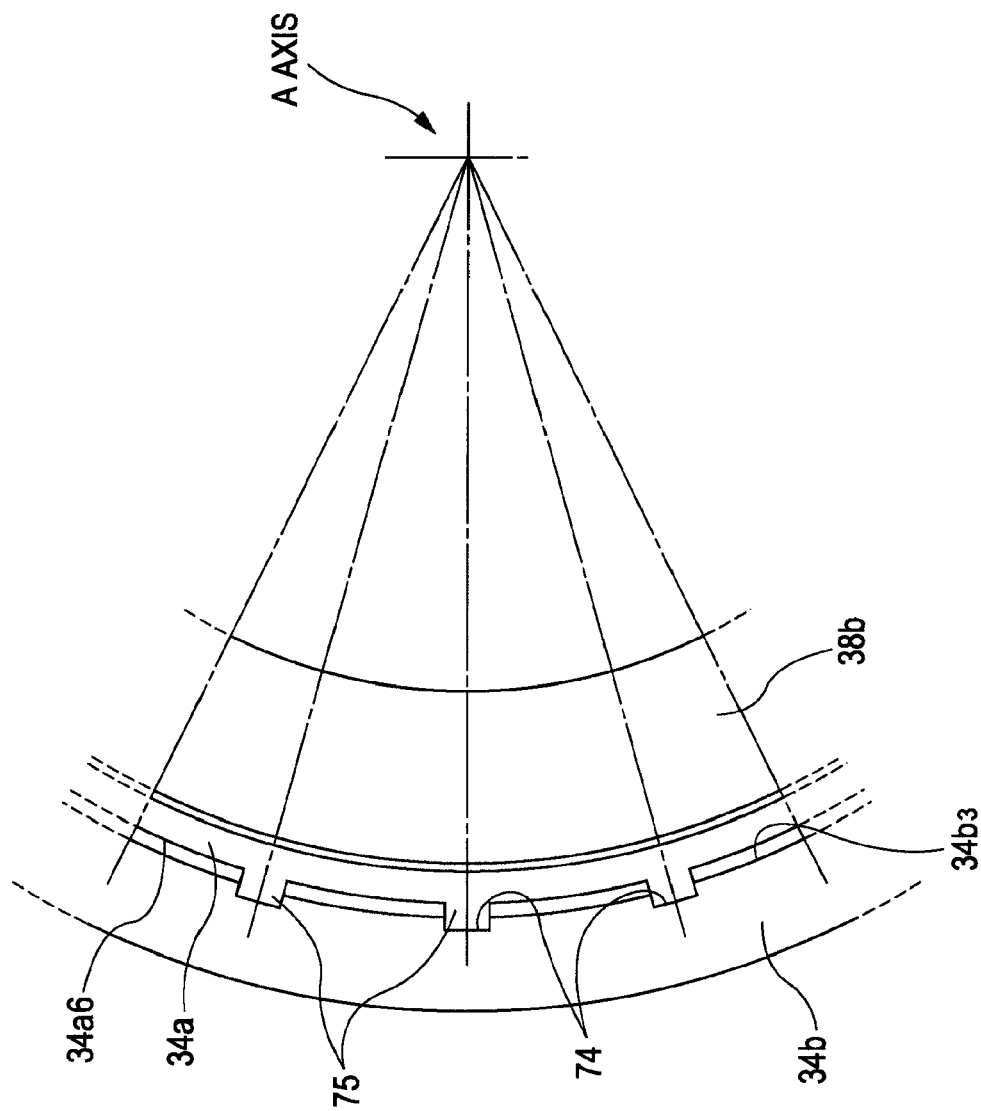
Figure 12:
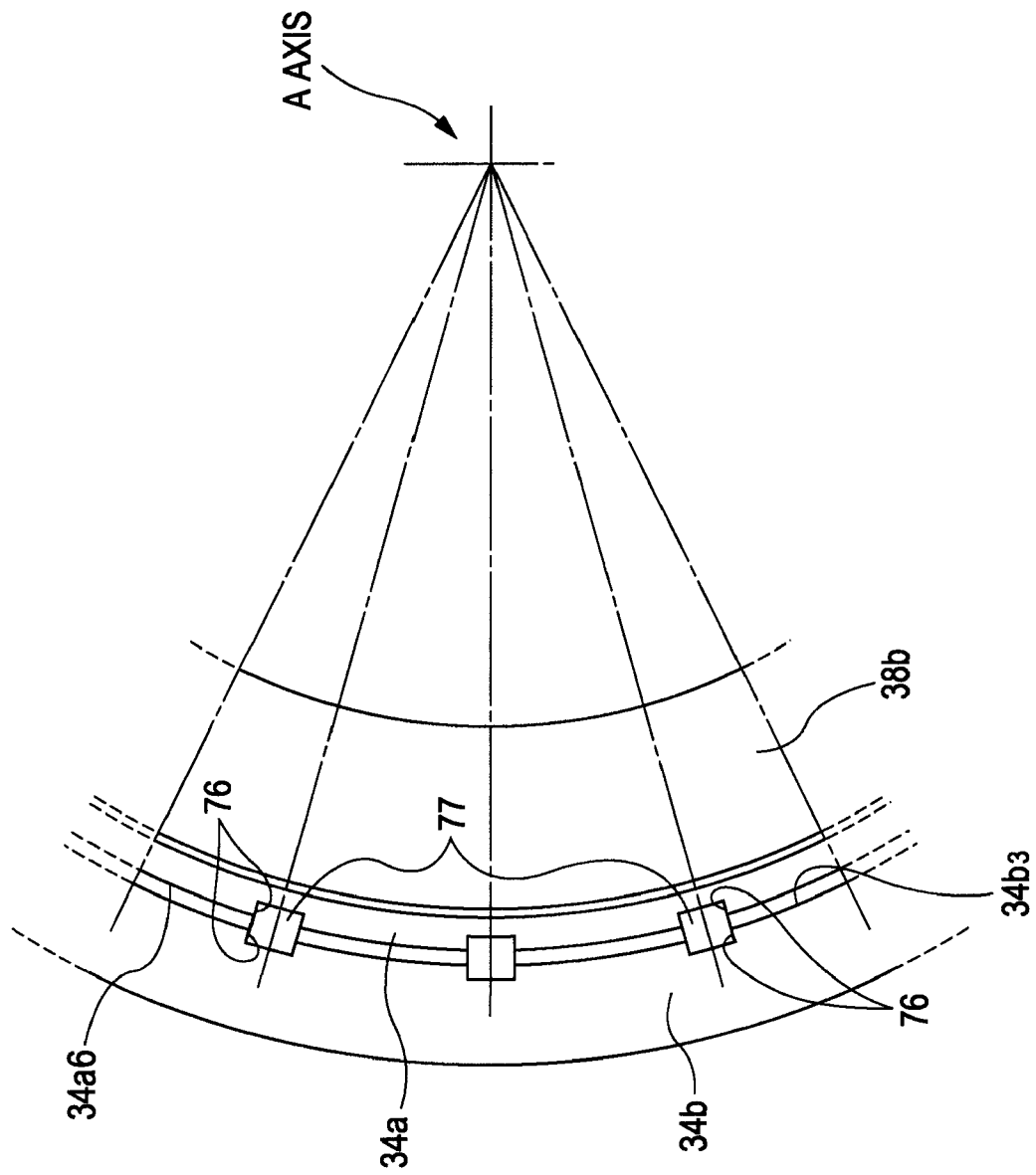

FIG. 11 shows an embodiment of a structure in which a plurality of protruding and recessed engagement portions are provided in the circumferential direction at an outer peripheral surface of the non-flange-side end portion of the cylindrical portion 34a2 and provided at an inner peripheral surface of an end portion of the pressure-receiving member 34*b*. For example, a plurality of protrusions 75 are provided to protrude from an outer peripheral portion 34*a*6 of the cylindrical portion 34*a*2, and a plurality of recesses 74 corresponding to the protrusions 75 are formed at an inner peripheral surface 34*b*3 of the end portion of the pressure-receiving member 34*b*. The protrusions 75 are fitted with the recesses 74, so that the non-flange-side end portion of the cylindrical portion 34*a*2 is locked in a non-rotatably manner relative to the pressure-receiving member 34*b*. During cutting processing or other processing, a rotational torque acting on the cylindrical portion 34*a*2 in the circumferential direction is released to the pressure-receiving member 34*b* from the non-flange-side end portion of the cylindrical portion 34*a*2. Accordingly, the distorted amount (twisted amount) of the flange portion 34*a*2 and the thin-wall portion 34*a*5 in the circumferential direction can be decreased. The fitted structure of the protrusions and recesses may be replaced with a structure with a spline or a serration similar to the fitted structure of the protrusions and recesses. FIG. 12 shows an embodiment of a structure in which a plurality of key grooves 76 extending in the axial direction are formed at an interval in each of the outer peripheral surface of the non-flange-side end portion of the cylindrical portion 34*a*2 and the inner peripheral surface of the end portion of the pressure-receiving member 34*b*. Keys 77 are press-fitted to the key grooves 76, to prevent the thin-wall section 34*a*5 from being twisted in the circumferential direction. In each of the embodiments shown in FIGS. 11 and 12, the structure may allow the pressure-receiving member 34*b* to be deformed outward in the radial direction when receiving a pressure force as a result of supply of pressure oil.

As described above, both sides of the clamp sleeve 34*a* with respect to the thin-wall portion 34*a*5 are locked to the housing 31*b* as the frame in a relatively non-displaceable manner in the circumferential direction. Accordingly, even when a large torque acts in the circumferential direction from the rotary shaft 39 during processing, e.g., cutting, of a workpiece, the torque can be released to the housing 31*b* at both sides of the cylindrical portion 34*a*2. That is, as compared with an indexing device in which locking relies upon only one side, i.e., the flange portion 34*a*, the torque which acts on an end of the cylindrical portion 34*a*2 and causes the cylindrical portion 34*a*2 to be distorted can be halved. Thusly, the total distorted amount (twisted amount) of the cylindrical portion 34*a*2 of the clamp sleeve 34*a* can be decreased. Accordingly, processing with a higher precision can be carried out, and fatigue of the clamp sleeve 34*a* can be decreased. It is to be noted that the configuration shown in any of FIGS. 8 to 12 may be applied to the embodiment of FIG. 6.

A rotary table does not have to only have a rotary shaft orthogonal to a bed of a machine tool. In particular, a rotary table may have an indexing function for rotary shafts of two or more axes, and the present invention is applicable to a clamp mechanism of at least one shaft of such rotary table.

The technical scope of the present invention is not limited to the above embodiments, and modifications are permissible without departing from the scope of the claimed invention.

The invention claimed is:

1. An indexing device for a machine tool, comprising:
   a frame having a through hole;
   a rotary shaft provided in the through hole and rotatably supported by the frame;
   a shaft provided coaxially and integrally with the rotary shaft;
   a ring-shaped clamp sleeve configured to surround an outer peripheral portion of the shaft, the clamp sleeve configured to provide a clamping force to act on the shaft and prevent the rotary shaft from rotating; and
   a cylindrical pressure-receiving member fixed to the frame through a plurality of clamp members,
   wherein the cylindrical pressure-receiving member is configured such that an outer peripheral surface of the cylindrical pressure-receiving member faces an inner peripheral surface of the through hole of the frame,
   wherein the clamp sleeve has a cylindrical portion coaxially inserted into the cylindrical pressure-receiving member, a flange portion extending outward in a radial direction from an end portion of the cylindrical portion and integrally formed with the cylindrical portion, and an annular groove formed over an outer peripheral portion of the cylindrical portion and having a bottom portion that defines a thin-wall section,
   wherein the frame has an attachment portion accommodating the flange portion of the clamp sleeve and having an engagement surface extending outward in the radial direction from the through hole,
   wherein the cylindrical pressure-receiving member is attached to the flange portion through the plurality of clamp members respectively screwed into a plurality of screw holes provided in the flange portion of the clamp sleeve while a shaft end of the cylindrical pressure-receiving member engages with the flange portion of the clamp sleeve, and the cylindrical pressure-receiving member is attached to the frame by fixing the flange portion of the clamp sleeve to the attachment portion of the frame,
   wherein a space surrounded by a bottom surface of the annular groove of the clamp sleeve and the inner peripheral surface of the cylindrical pressure-receiving member forms a pressure chamber communicating with a fluid control circuit, pressure fluid being supplied to the pressure chamber, the pressure fluid causing the thin-wall section of the clamp sleeve to be deformed in a diameter-decreasing direction to generate the clamping force against the shaft, and
   wherein a predetermined gap is provided between the inner peripheral surface of the through hole in the frame and the outer peripheral surface of the cylindrical pressure-receiving member.

2. The indexing device according to claim 1,
   wherein a shaft end of the cylindrical pressure-receiving member opposite to a shaft end engaging with the frame has an engagement surface extending outward in a radial direction,
   wherein the clamp members are defined by engagement members having engagement surfaces engaging with the shaft end of the cylindrical pressure-receiving member opposite to the engaging shaft end, and by screw members engaging with the engagement members,
   wherein the cylindrical pressure-receiving member is attached to the frame by screwing the screw members into a plurality of screw holes provided in the frame while the engagement surfaces of the engagement members engage with the cylindrical pressure-receiving member, and
   wherein a predetermined gap is provided between the cylindrical pressure-receiving member and a surface of each screw member facing the cylindrical pressure-receiving member at the center side of the rotary shaft.

3. The indexing device according to claim 2,
   wherein the engagement members have at their outer circumferences step surfaces serving as the engagement surfaces extending outward in the radial direction, and are formed of loose-fit members having through holes to which the screw members can be inserted, wherein the cylindrical pressure-receiving member has a plurality of bottomed through holes extending from an end portion opposite to an end surface engaging with the frame and arranged in a circumferential direction at an interval and being capable of engaging with the engagement surfaces of the loose-fit members, wherein the cylindrical pressure-receiving member is attached to the frame by screwing the screw members extending through the loose-fit members into the screw holes provided in the frame while the loose-fit members are inserted into the bottomed through holes, and wherein a predetermined gap is provided between an inner peripheral surface of each through hole of the cylindrical pressure-receiving member and an outer peripheral surface of each loose-fit member.

4. The indexing device for a machine tool according to claim 1, wherein a non-flange-side end portion of the cylindrical portion of the clamp sleeve is locked in a non-rotatable manner relative to the cylindrical pressure-receiving member.

* * * * *